United States Patent
Dittmer et al.

(10) Patent No.: US 12,061,091 B2
(45) Date of Patent: *Aug. 13, 2024

(54) METHODS AND SYSTEMS FOR SUN-AWARE VEHICLE ROUTING

(71) Applicant: Waymo LLC, Mountain View, CA (US)

(72) Inventors: Jeremy Dittmer, Mountain View, CA (US); Andreas Wendel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,475

(22) Filed: Jan. 19, 2023

(65) Prior Publication Data

US 2023/0152107 A1 May 18, 2023

Related U.S. Application Data

(63) Continuation of application No. 17/149,984, filed on Jan. 15, 2021, now Pat. No. 11,561,108, which is a
(Continued)

(51) Int. Cl.
*G01C 21/36* (2006.01)
*G01C 21/34* (2006.01)
(Continued)

(52) U.S. Cl.
CPC ....... *G01C 21/3461* (2013.01); *G05D 1/0246* (2013.01); *G06T 7/70* (2017.01);
(Continued)

(58) Field of Classification Search
CPC .......... G01C 21/3415; B60W 2420/42; G06V 20/56; G06T 7/70; G06D 1/0246;
(Continued)

(56) References Cited

U.S. PATENT DOCUMENTS 6,463,373 B2 10/2002 Suganuma et al.
6,667,471 B2 12/2003 Bos et al.
(Continued)

FOREIGN PATENT DOCUMENTS

AU 2015222926 A1 10/2016
CN 104925053 A 9/2015
(Continued)

OTHER PUBLICATIONS

Factors influencing traffic signal violations by car drivers, cyclists, and pedestrians: A case study from Guangdong, China; by Guangnan Zhang et al.; https://doi.org/10.1016/j.trf.2016.08.001 (Year: 2016).*
(Continued)

*Primary Examiner* — Cuong H Nguyen
(74) *Attorney, Agent, or Firm* — McDonnell Boehnen Hulbert & Berghoff LLP

(57) ABSTRACT

Example implementations may relate to sun-aware vehicle routing. In particular, a computing system of a vehicle may determine an expected position of the sun relative to a geographic area. Based on the expected position, the computing system may make a determination that travel of the vehicle through certain location(s) within the geographic area is expected to result in the sun being proximate to an object within a field of view of the vehicle's image capture device. Responsively, the computing system may generate a route for the vehicle in the geographic area based at least on the route avoiding travel of the vehicle through these certain location(s), and may then operate the vehicle to travel in accordance with the generated route. Ultimately, this may help reduce or prevent situations where quality of image(s) degrades due to sunlight, which may allow for use of these image(s) as basis for operating the vehicle.

18 Claims, 16 Drawing Sheets

Related U.S. Application Data continuation of application No. 15/842,055, filed on Dec. 14, 2017, now Pat. No. 10,921,142.

(51) Int. Cl.
*G05D 1/00* (2006.01)
*G06T 7/70* (2017.01)
*G06V 20/56* (2022.01)
*B60W 60/00* (2020.01)

(52) U.S. Cl.
CPC ......... *G06V 20/56* (2022.01); *B60W 60/0015* (2020.02); *B60W 2420/403* (2013.01); *G06T 2207/10004* (2013.01)

(58) Field of Classification Search
CPC ... E02F 9/26; E02F 9/262; E02F 9/265; E02F 9/2041; E02F 9/22; E02F 3/3677; E02F 3/32; E02F 3/435; E02F 3/439; E02F 3/43; E02F 3/433; H04N 23/58
USPC ............................................ 701/23; 382/103
See application file for complete search history.

(56) References Cited

U.S. PATENT DOCUMENTS

| | | | |
|---|---|---|---|
| 6,811,201 B2 | 11/2004 | Naik | |
| 8,392,074 B2 | 3/2013 | Zeng et al. | |
| 8,676,431 B1 | 3/2014 | Mariet et al. | |
| 9,712,741 B2 | 7/2017 | Kothari | |
| 9,720,415 B2 | 8/2017 | Levinson et al. | |
| 9,731,729 B2 | 8/2017 | Solyom et al. | |
| 9,947,221 B1 | 4/2018 | Mazzola | |
| 10,150,473 B2 | 12/2018 | Aharony et al. | |
| 10,591,608 B2 | 3/2020 | Ibrahim et al. | |
| 10,723,267 B2 | 7/2020 | Kothari | |
| 10,757,320 B2 | 8/2020 | Wendel et al. | |
| 10,921,142 B2 * | 2/2021 | Dittmer .............. | G01C 21/3415 |
| 11,073,622 B2 | 7/2021 | Cohen | |
| 11,561,108 B2 * | 1/2023 | Dittmer .............. | G01C 21/3415 |
| 2003/0103141 A1 | 6/2003 | Bechtel et al. | |
| 2006/0140502 A1 | 6/2006 | Tseng et al. | |
| 2007/0280069 A1 | 12/2007 | Cheng et al. | |
| 2010/0094501 A1 * | 4/2010 | Kwok ........................ | B60J 3/04 |
| | | | 359/609 |
| 2010/0106356 A1 | 4/2010 | Trepagnier et al. | |
| 2011/0227952 A1 | 9/2011 | Hamaguchi | |
| 2012/0062747 A1 | 3/2012 | Zeng | |
| 2013/0010111 A1 | 1/2013 | Laforte et al. | |
| 2013/0218449 A1 | 8/2013 | Hymel et al. | |
| 2013/0300911 A1 | 11/2013 | Beckman | |
| 2014/0214255 A1 | 7/2014 | Dolgov et al. | |
| 2014/0379247 A1 | 12/2014 | Ferguson et al. | |
| 2015/0124150 A1 | 5/2015 | Hibino | |
| 2015/0266488 A1 * | 9/2015 | Solyom ................. | B60W 10/20 |
| | | | 701/28 |
| 2016/0011318 A1 | 1/2016 | Cohen | |
| 2016/0046290 A1 | 2/2016 | Aharony et al. | |
| 2017/0013188 A1 | 1/2017 | Kothari | |
| 2017/0072880 A1 | 3/2017 | Higgins-Luthman et al. | |
| 2017/0115480 A1 | 4/2017 | Wada et al. | |
| 2017/0123419 A1 | 5/2017 | Levinson et al. | |
| 2017/0176641 A1 | 6/2017 | Zhu et al. | |
| 2017/0177000 A1 | 6/2017 | Meyhofer et al. | |
| 2017/0195605 A1 | 7/2017 | Alves | |
| 2017/0219374 A1 | 8/2017 | Sitarski et al. | |
| 2017/0313248 A1 | 11/2017 | Kothari | |
| 2017/0316273 A1 * | 11/2017 | Ferguson ......... | G08G 1/096791 |
| 2017/0337813 A1 * | 11/2017 | Taylor .................. | G05D 1/0285 |
| 2018/0045832 A1 | 2/2018 | Ibrahim et al. | |
| 2018/0091717 A1 | 3/2018 | Ion | |
| 2018/0126910 A1 | 5/2018 | Herrmann et al. | |
| 2018/0164107 A1 | 6/2018 | Yalla | |
| 2018/0188032 A1 * | 7/2018 | Ramanandan .......... | G01S 19/52 |
| 2018/0272942 A1 | 9/2018 | Dudar | |
| 2018/0272943 A1 | 9/2018 | Dudar | |
| 2019/0186931 A1 | 6/2019 | Dittmer et al. | |
| 2019/0208111 A1 | 7/2019 | Wendel et al. | |
| 2019/0384313 A1 | 12/2019 | Toth et al. | |
| 2020/0298871 A1 | 9/2020 | Mukai et al. | |
| 2021/0131816 A1 * | 5/2021 | Dittmer ..................... | G06T 7/70 |

FOREIGN PATENT DOCUMENTS

| | | | |
|---|---|---|---|
| CN | 106470901 A | | 3/2017 |
| DE | 102016001231 A1 | | 8/2016 |
| DE | 102016001231 A1 * | | 8/2016 |
| EP | 2629056 A1 | | 8/2013 |
| EP | 2351351 B1 | | 9/2015 |
| EP | 2948928 B1 | | 7/2017 |
| EP | 3707573 B1 * | | 3/2023 |
| JP | 108-159800 A | | 6/1996 |
| JP | 2005-008058 A | | 1/2005 |
| JP | 2007-139477 A | | 6/2007 |
| JP | 2007315799 A | | 12/2007 |
| JP | 2011-158281 A | | 8/2011 |
| JP | 2017207340 A | | 11/2017 |
| JP | 7149331 B2 * | | 10/2022 |
| WO | 2010040386 A1 | | 4/2010 |
| WO | 2015130950 A2 | | 9/2015 |
| WO | 2016197307 A1 | | 12/2016 |
| WO | 2018122586 A1 | | 7/2018 |
| WO | WO-2019118234 A1 * | | 6/2019 |

OTHER PUBLICATIONS

F. Lindner, U. Kressel and S. Kaelberer, "Robust recognition of traffic signals," IEEE Intelligent Vehicles Symposium, 2004, Parma, Italy, 2004, pp. 49-53, doi: 10.1109/IVS.2004.1336354. (Year: 2004).*

K. Yoneda, N. Ichihara, H. Kawanishi, T. Okuno, L. Cao and N. Suganuma, "Sun-Glare region recognition using Visual explanations for Traffic light detection," 2021 IEEE Intelligent Vehicles Symposium (IV), Nagoya, Japan, 2021, pp. 1464-1469, doi: 10.1109/IV48863.2021.9575631. (Year: 2021).*

Rosayyan, Prakash, et al. An abstract for "Dead Reckoning in Emergency Vehicle Preemption System Using Deep Output Kernel Learning and Extended Kalman Filter." IETE Journal of Research (2024): 1-18. (Year: 2024).*

The Trouble with Autopilots: Assisted and Autonomous Driving on the Social Road by Barry Brown et al., CHI'17: Proceedings of the 2017 CHI Conference on Human Factors in Computing Systems; May 2017, pp. 416-429, https://doi.org/10.1145/3025453.3025462 (Year: 2017).

B. Kim, Y. Kashiba, S. Dai and S. Shiraishi, "Testing Autonomous Vehicle Software in the Virtual Prototyping Environment," in IEEE Embedded Systems Letters, vol. 9, No. 1, pp. 5-8, Mar. 2017, doi: 10.1109/LES.2016.2644619. (Year: 2017).

Q. Li, L. Chen, M. Li, S.-L. Shaw and A. Nuchter, "A Sensor-Fusion Drivable-Region and Lane-Detection System for Autonomous Vehicle Navigation in Challenging Road Scenarios," in IEEE Transactions on Vehicular Technology, vol. 63, No. 2, pp. 540-555, Feb. 2014, doi: 10.1109/TVT.2013.2281199. (Year: 2014).

X. Zhang et al., "Finding Critical Scenarios for Automated Driving Systems: A Systematic Mapping Study," in IEEE Transactions on Software Engineering, doi: 10.1109/TSE.2022.3170122. (Year: 2022).

Automated drivability: Toward an assessment of the spatial deployment of level 4 automated vehicles by Aggelos Soteropouloset al.; Transportation Research Park A: Policy and Practice; vol. 136, Jun. 2020, pp. 64-84; https://doi.org/10.1016/j.tra.2020.03.024_(Year: 2020).

On the sea trial test for the validation of an autonomous collision avoidance system of unmanned surface vehicle, Aragon Namsun Son; Sun-Young Kim; Oceans 2018 MTS/IEEE Charleston; IEEE Conference Paper. (Year: 2018).

Low-cost vector map assisted navigation strategy for autonomous vehicle; Wenda Li; Xianjie Meng; Zheng Wang; Wenqi Fang; Jie

(56) References Cited

OTHER PUBLICATIONS

Zou; Huiyun Li; Tianfu Sun; Jianing Liang; 2018 IEEE Asia Pacific Conference on Circuits and Systems (APCCAS); IEEE Conference Paper. (Year: 2018).

Autonomous navigation for deep spacecraft based on celestial objects; Min Song; Yunbin Yuan; 2008 2nd International Symposium on Systems and Control in Aerospace and Astronautics; IEEE Conference Paper. (Year: 2008).

Robust Ego-motion Estimation and Map Matching Technique for Autonomous Vehicle Localization with High Definition Digital Map, Seung-Jun Han et al; 2018 International Conference on Information and Communication Technology Convergence (ICTC); IEEE Conference Paper (Year: 2018).

International Search Report and Written Opinion for corresponding PCT application No. PCT/US2018/063877, dated Mar. 26, 2019.

\* cited by examiner

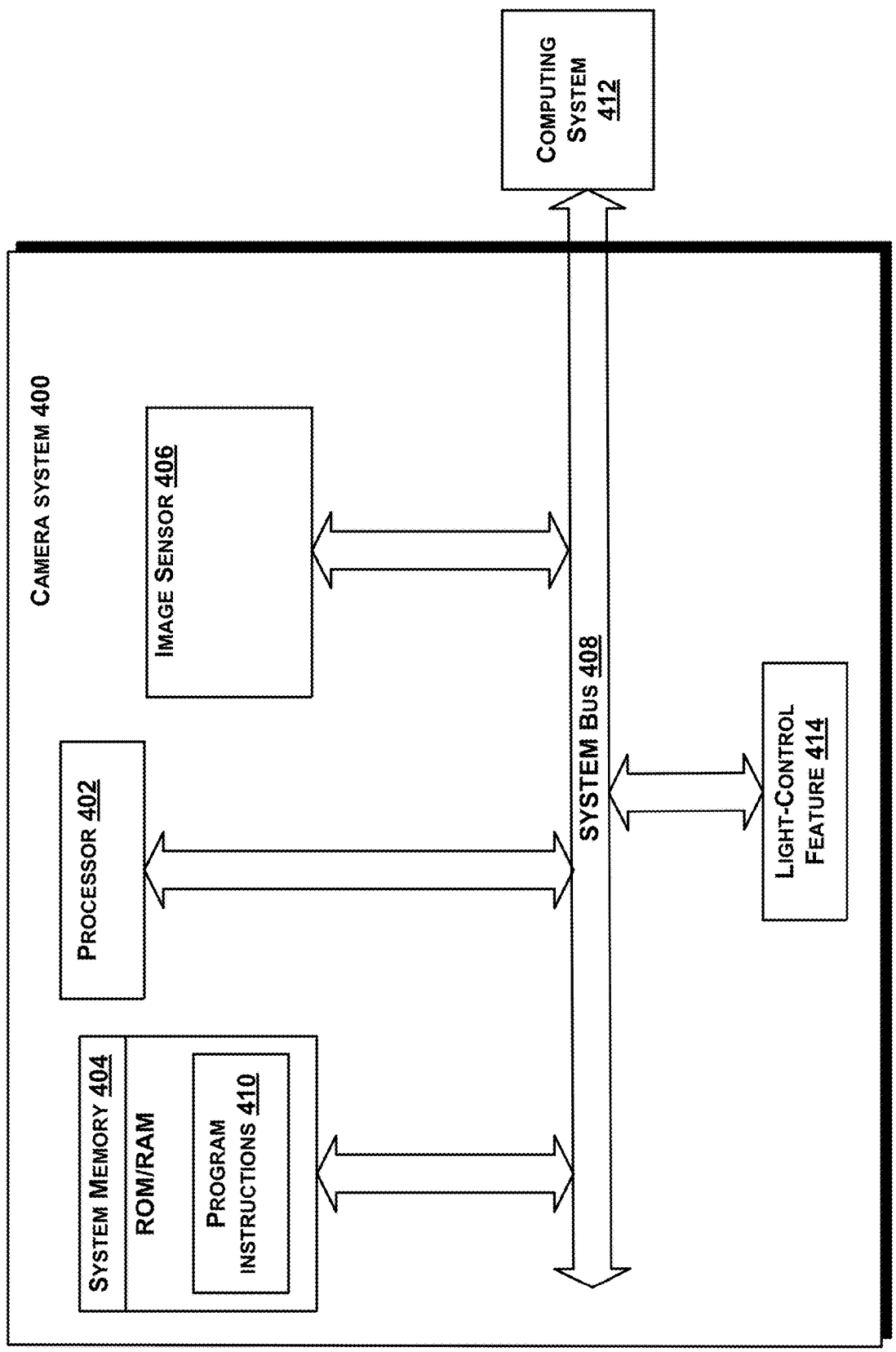

METHODS AND SYSTEMS FOR SUN-AWARE VEHICLE ROUTING

CROSS-REFERENCE TO RELATED APPLICATIONS

This application is a continuation of U.S. patent application Ser. No. 17/149,984, filed Jan. 15, 2021, which is a continuation of U.S. patent application Ser. No. 15/842,055, filed Dec. 14, 2017. The foregoing applications are incorporated herein by reference.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by an autonomous vehicle system (i.e., any one or more computer systems that individually or collectively function to facilitate control of the autonomous vehicle). In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one aspect, a method is disclosed. The method involves determining, by a computing system, an expected position of the sun relative to a geographic area, where the computing system is configured to operate a vehicle based at least on image data generated by an image capture device that is coupled to the vehicle. The method also involves, based at least on the expected position of the sun relative to the geographic area, making a determination, by the computing system, that travel of the vehicle through one or more locations within the geographic area is expected to result in the sun being proximate to an object within a field of view of the image capture device from a perspective of the image capture device. The method additionally involves, in response to making the determination, generating a route for the vehicle in the geographic area based at least on the route avoiding travel of the vehicle through the one or more locations. The method further involves operating the vehicle to travel in accordance with the generated route.

In another aspect, a computing system is disclosed, the computing system being configured to operate a self-driving vehicle based at least on image data generated by an image capture device that is coupled to the vehicle. In particular, the computing system includes one or more processors, a non-transitory computer readable medium, and program instructions stored on the non-transitory computer readable medium and executable by the one or more processors to perform operations. Specifically, the program instructions may be executable to determine an expected position of the sun relative to a geographic area. Also, the program instructions may be executable to, based at least on the expected position of the sun relative to the geographic area, make a determination that travel of the vehicle through one or more locations within the geographic area is expected to result in the sun being proximate to an object within a field of view of the image capture device from a perspective of the image capture device. Additionally, the program instructions may be executable to, in response to making the determination, generate a route for the vehicle in the geographic area based at least on the route avoiding travel of the vehicle through the one or more locations. Further, the program instructions may be executable to operate the vehicle to travel in accordance with the generated route.

In yet another aspect, a vehicle is disclosed. The vehicle includes an image capture device configured to generate image data representative of an environment around the vehicle and a computing system configured to operate the vehicle based at least on image data generated by the image capture device. Also, the computing system may configured to: (i) determine an expected position of the sun relative to a geographic area; (ii) based at least on the expected position of the sun relative to the geographic area, make a determination that travel of the vehicle through one or more locations within the geographic area is expected to result in the sun being proximate to an object within a field of view of the image capture device from a perspective of the image capture device; (iii) in response to making the determination, generate a route for the vehicle in the geographic area based at least on the route avoiding travel of the vehicle through the one or more locations; and (iv) operate the vehicle to travel in accordance with the generated route.

In yet another aspect, another system is disclosed. The system may include means for determining an expected position of the sun relative to a geographic area, where a vehicle is operable based at least on image data generated by an image capture device that is coupled to the vehicle. The system may also include means for, based at least on the expected position of the sun relative to the geographic area, making a determination that travel of the vehicle through one or more locations within the geographic area is expected to result in the sun being proximate to an object within a field of view of the image capture device from a perspective of the image capture device. The system may additionally include means for, in response to making the determination, generating a route for the vehicle in the geographic area based at least on the route avoiding travel of the vehicle through the one or more locations. The system may further include means for operating the vehicle to travel in accordance with the generated route.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4A is a simplified block diagram depicting example components of an example camera system.

DETAILED DESCRIPTION

Figure 1:
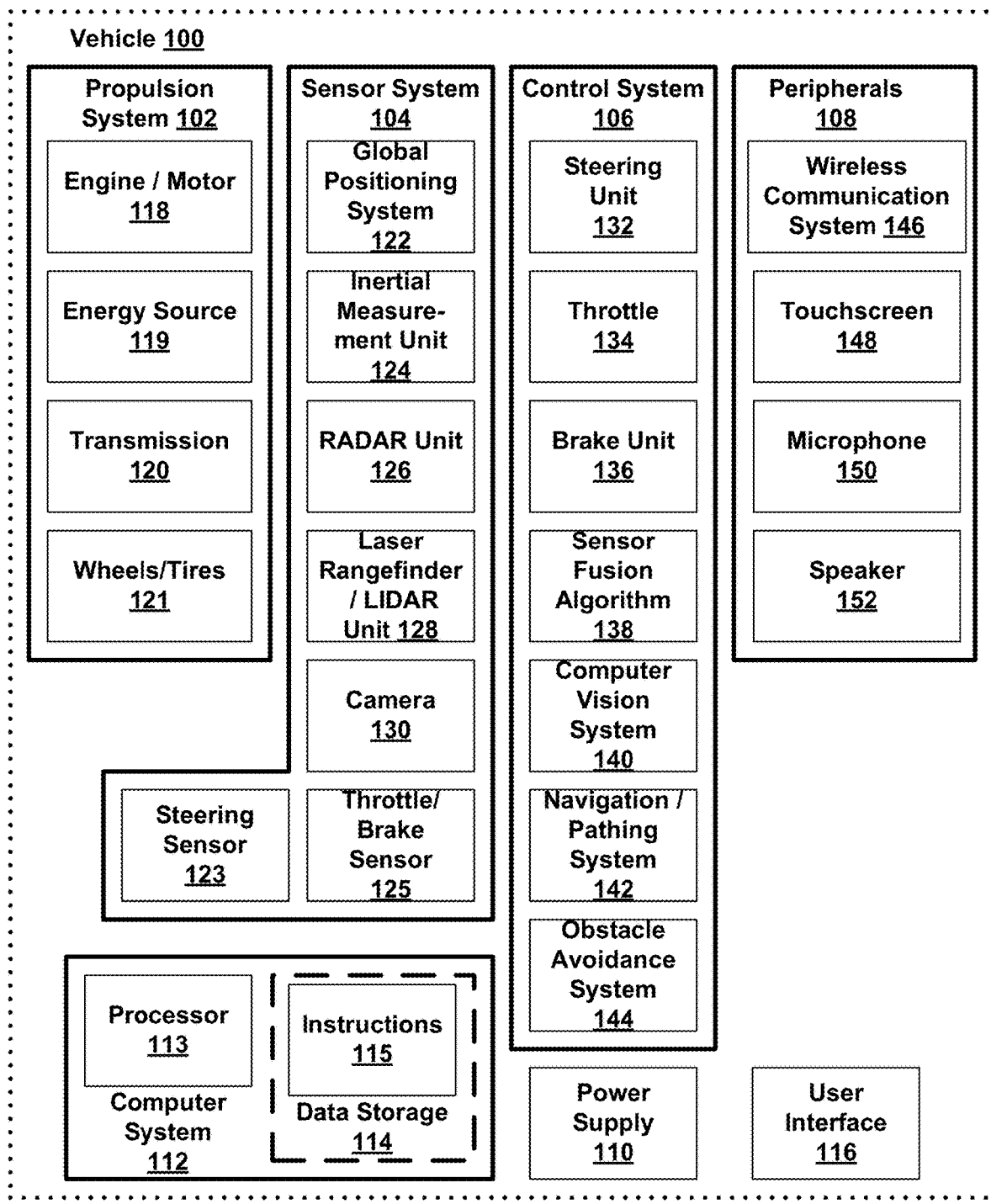
FIG. 1 is a functional block diagram illustrating a vehicle, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

A vehicle can be configured to operate in an autonomous mode in which the vehicle navigates through an environment with little or no input from a driver. Such an autonomous vehicle can include an image capture device (e.g., one or more cameras) configured to generate image data that provides information about the environment in which the vehicle operates. A computing system of the vehicle may use the image data generated by the image capture device as a basis for operating the vehicle in an autonomous mode.

In some situations, however, quality of image data generated by an image capture device may degrade due to sunlight encountered by the image capture device. For example, when the autonomous vehicle is at an intersection having a traffic signal, the sun may end up being substantially proximate to the traffic signal (e.g., behind the traffic light) within a field of view of the image capture device from a perspective of the image capture device. In turn, this situation may lead to blooming degradation of images captured by the image capture device, such as due to blooming, lens flare, or stray light, among others. As a result, the computing system may be unable to use such images as basis for determining a color or state of the traffic signal and thus as basis for determining subsequent autonomous operations that the vehicle should carry out at the intersection.

Disclosed herein is an approach that may help overcome this issue. In accordance with the disclosed approach, a computing system could track the sun's position relative to a geographic area, and could determine a route for the vehicle that helps prevent a situation where the sun is proximate to an object within the field of view of the image capture device from the perspective of the image capture device. Once the route is determined, the computing system could then operate the vehicle to travel in accordance with the determined route.

More specifically, the computing system could determine an expected position of the sun relative to a geographic area, and could use at least the expected position as basis for making a determination that travel of the vehicle through one or more locations within the geographic area is expected to result in the sun being proximate to an object within the field of view of the image capture device from the perspective of the image capture device. To do so, the computing system could, for instance, use ephemeris data to determine the sun's position in the sky over the geographic area at a given time. Given the sun's position over the geographic area at the given time, the computing system could then predict the sun's position relative to the image capture device's field of view if the vehicle is to travel in a given location within the geographic area at the given time. Based on the sun's predicted position relative to the image capture device's field of view and possibly also based on an object's predicted position and/or orientation relative to the image capture device, the computing system could then determine whether travel of the vehicle through the given location at the given time is expected to result in the sun being proximate to the object within a field of view of the image capture device from the perspective of the image capture device.

In a specific example, the computing system could use ephemeris data to determine position of the sun in the sky over an intersection at a given time. Additionally, the computing system could predict orientation and position of the image capture device if the vehicle were to travel through a particular portion of the intersection at the given time. Further, the computing system could predict orientation and/or position of a traffic signal in the intersection relative to the image capture device if the vehicle were to travel through the particular portion at the given time. Given this information, the computing system could then determine that, if the vehicle were to travel through the particular portion of the intersection at the given time, the sun is expected to be proximate to the traffic signal within the field of view of the image capture device from a perspective of the image capture device.

Once the computing system makes a determination that travel of the vehicle through one or more locations within the geographic area is expected to result in the sun being proximate to an object within a field of view of the image capture device from a perspective of the image capture device, the computing system may responsively use this determination as a factor when determining a route for the vehicle. In particular, the computing system may responsively determine a route for the vehicle in the geographic area that avoids travel of the vehicle through the one or more locations, such as at one or more times during which the sun is expected to be proximate to the object within the field of view of the image capture device. By way of example, if one of the locations at issue is a particular lane in a particular road, then the computing system may determine a route for the vehicle that involves travel on that same particular road, but instead involves travel on a lane other than the particular lane. In another example, if one of the locations at issue includes all lanes of a particular road, then the computing system may determine a route for the vehicle that avoids that particular road altogether. Other examples are also possible.

II. Example Vehicle Systems and Operations

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other implementations, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the implementation, computer system 112 could be operable to monitor many aspects of vehicle 100 and its subsystems. In some implementations, computer system 112 may disable some or all functions of the vehicle 100 based on signals received from sensor system 104.

The components of vehicle 100 could be configured to work in an interconnected fashion with other components within or outside their respective systems. For instance, in an example implementation, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some implementations, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
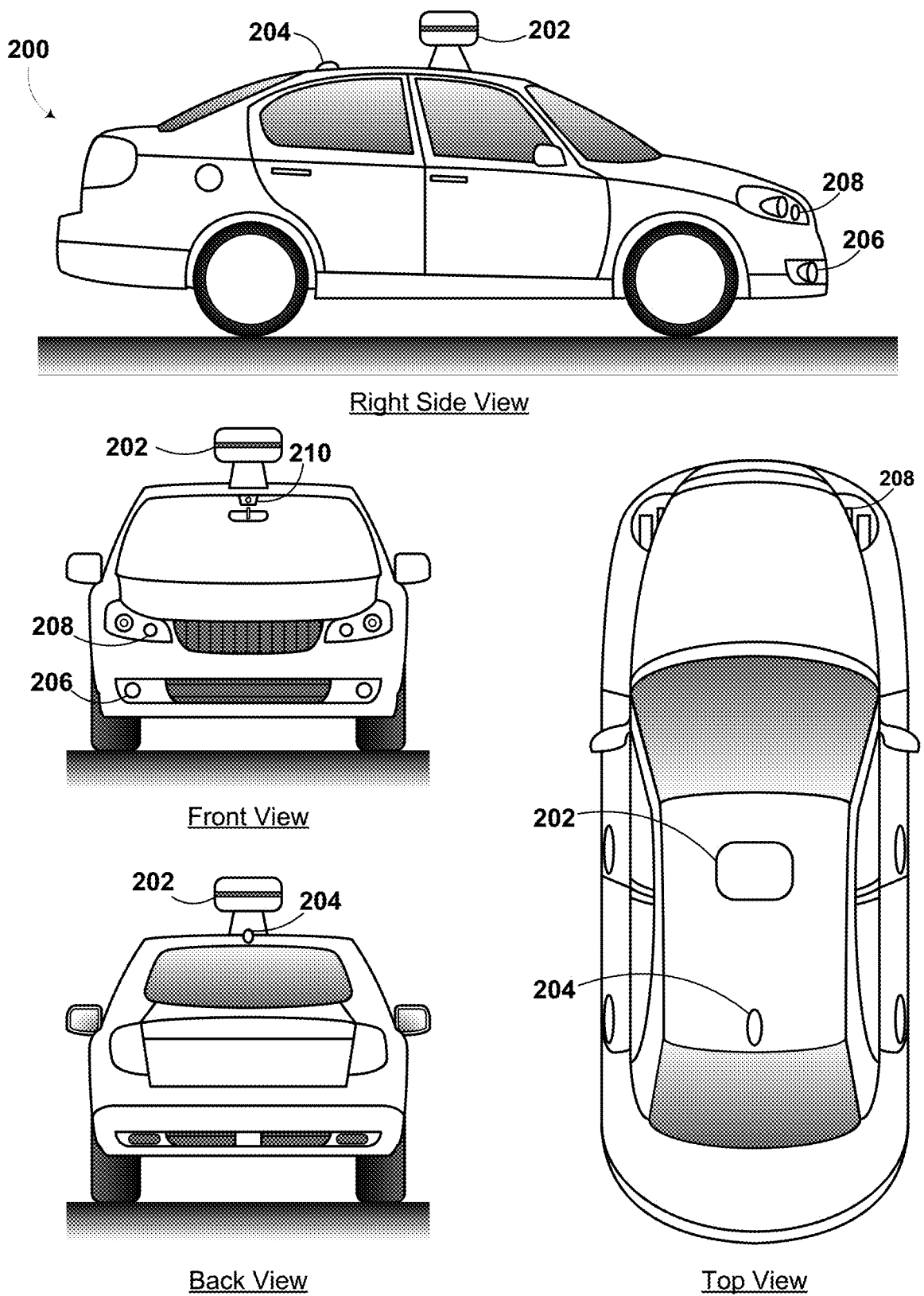
FIG. 2 is a conceptual illustration of a physical configuration of a vehicle, according to an example implementation.

FIG. 2 depicts an example physical configuration of vehicle 200, which may represent one possible physical configuration of vehicle 100 described in reference to FIG. 1. Depending on the implementation, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking (front-facing) view with respect to vehicle 200, but other mounting locations (including movable mounts) and viewing angles of camera 210 are possible within implementations. For instance, camera 210 could be positioned within the vehicle so that the camera captures images of the environment of vehicle 200 through a windshield of vehicle 200.

In some examples, camera 210 may correspond to one or more visible light cameras. Alternatively or additionally, camera 210 may include infrared sensing capabilities. Camera 210 may also include optics that may provide an adjustable field of view. Other examples are also possible.

Figure 3:
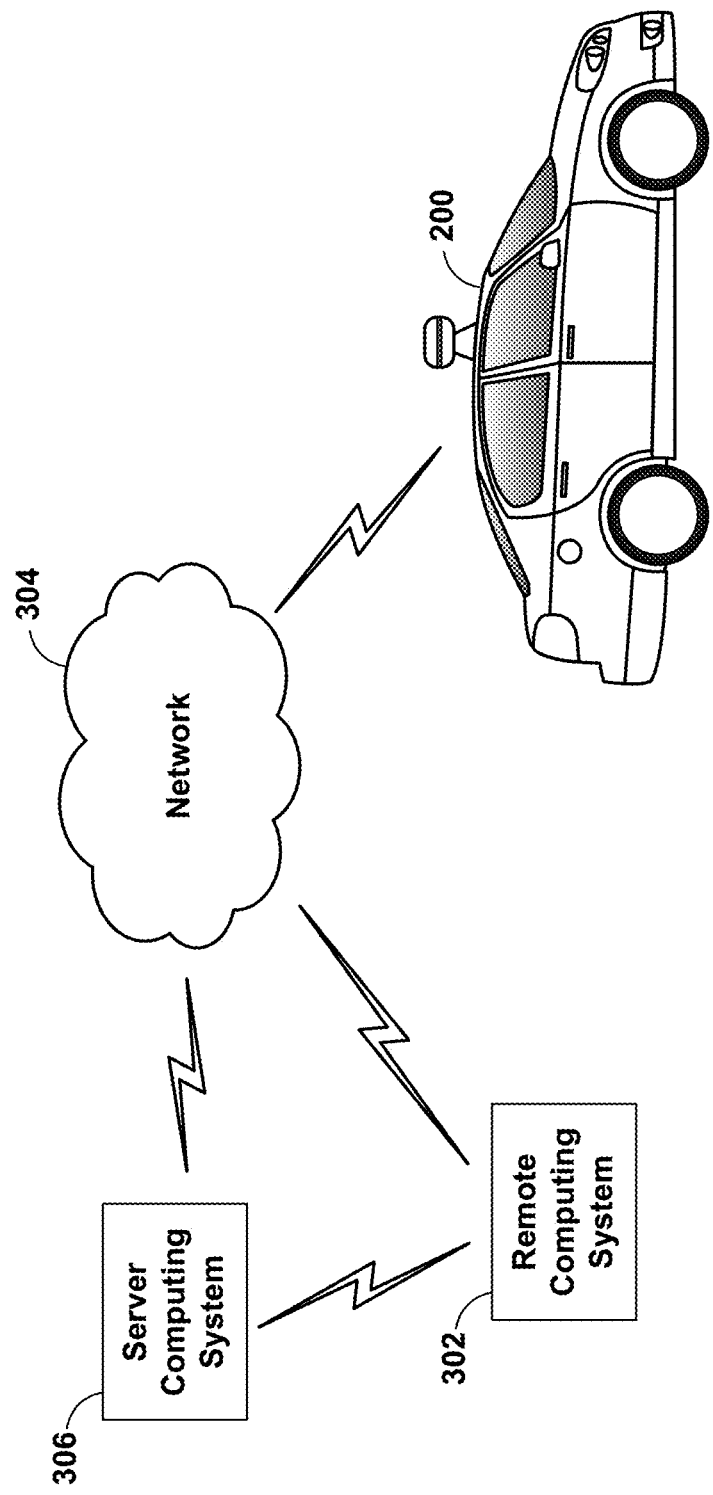
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

III. Example Camera Systems and Operations

FIG. 4A shows a simplified block diagram depicting example components of an example camera system 400. This example camera system 400 could correspond to camera 130. Also, although various components of camera system 400 are shown as distributed components, it should be understood that any of such components may be physically integrated and/or distributed according to the desired configuration of the computing system.

Camera system 400 may include at least one processor 402 and system memory 404. In an example embodiment, camera system 400 may include a system bus 408 that communicatively connects processor 402 and system memory 404, as well as other components of camera system 400. Depending on the desired configuration, processor 402 can be any type of processor including, but not limited to, a microprocessor (µP), a microcontroller (µC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof. In some examples, the system memory 404 may be a memory cache to temporarily store image data.

An example camera system 400 may include various other components as well. For example, the camera system 400 includes an image sensor 406. The image sensor 406 may be an image sensor such as described herein. For instance, the image sensor 406 may include a rolling shutter and be configured to have portions selectively enabled or disabled by the processor 402. Additionally, the camera system 400 may include program instructions 410 that are stored in system memory 404 (and/or possibly in another data-storage medium) and executable by processor 402 to facilitate the various functions described herein.

Further, the camera system 400 may be coupled to an external computing system. The external computing system 412 may be a computing system located in a different portion of the autonomous vehicle and/or located at a remote computer server. For instance, external computing system 412 could be computing system 112. In any case, the computing system 412 may control various operations of the camera system 400, among other options.

According to example embodiments, the camera system 400 could also include a light-control feature 414 that is adjustable to control an extent of external light encountered by the camera system 400 (e.g., by the image sensor 406). As further described herein, the light-control feature 414 could be a mechanical device, such as a wiper for instance. Additionally or alternatively, the light-control feature 414 could be light-control device having adjustable light transmission properties, such as an electrochromic device (e.g., an electrochromic window) or a variable liquid-crystal display (LCD). Moreover, the light-control feature 414 could be controlled by a computing system, such as by computing system 412 for instance. Other arrangements are also possible.

Figure 4B:
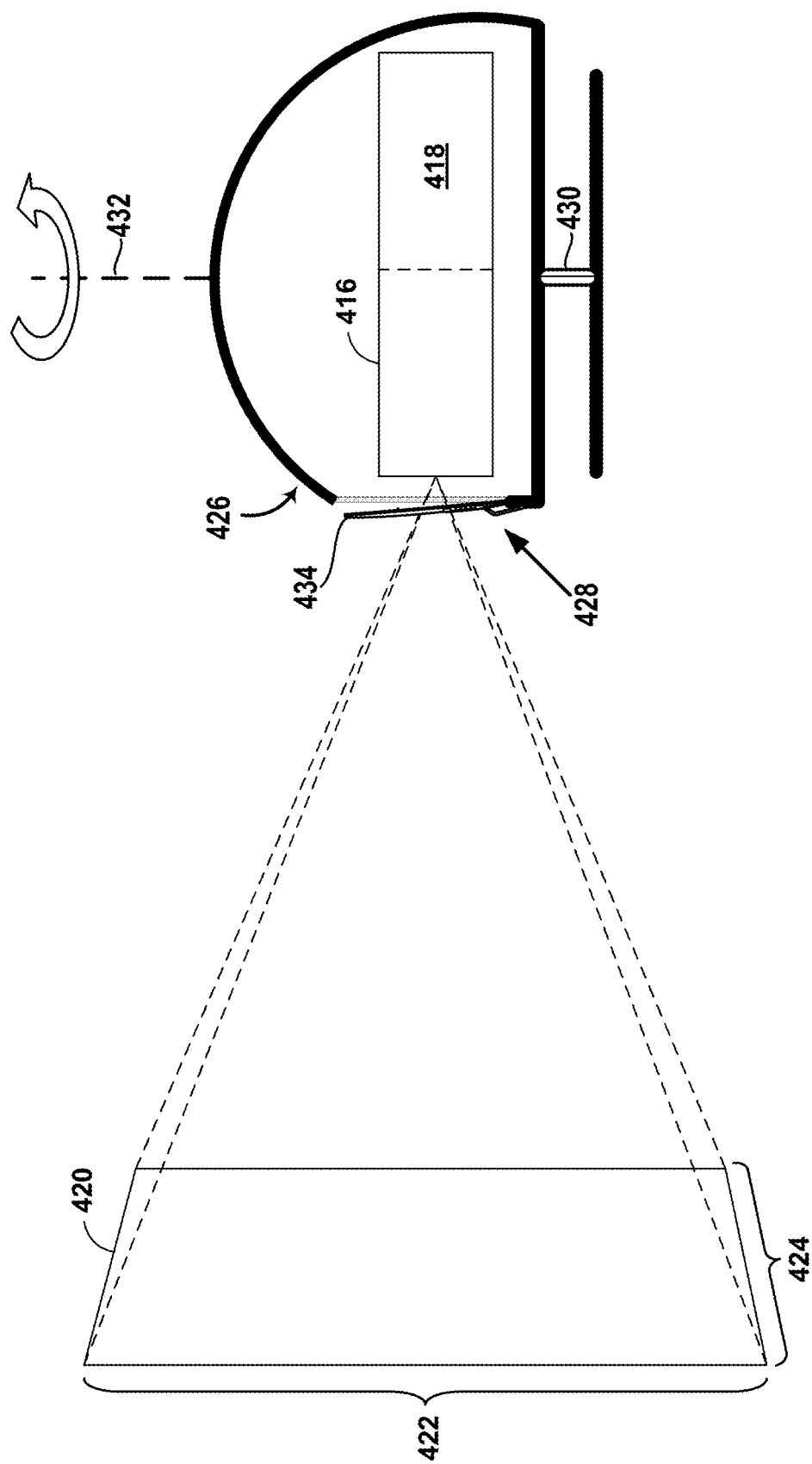
FIG. 4B illustrates an arrangement of a camera and a wiper, according to an example implementation.
Figure 4C:
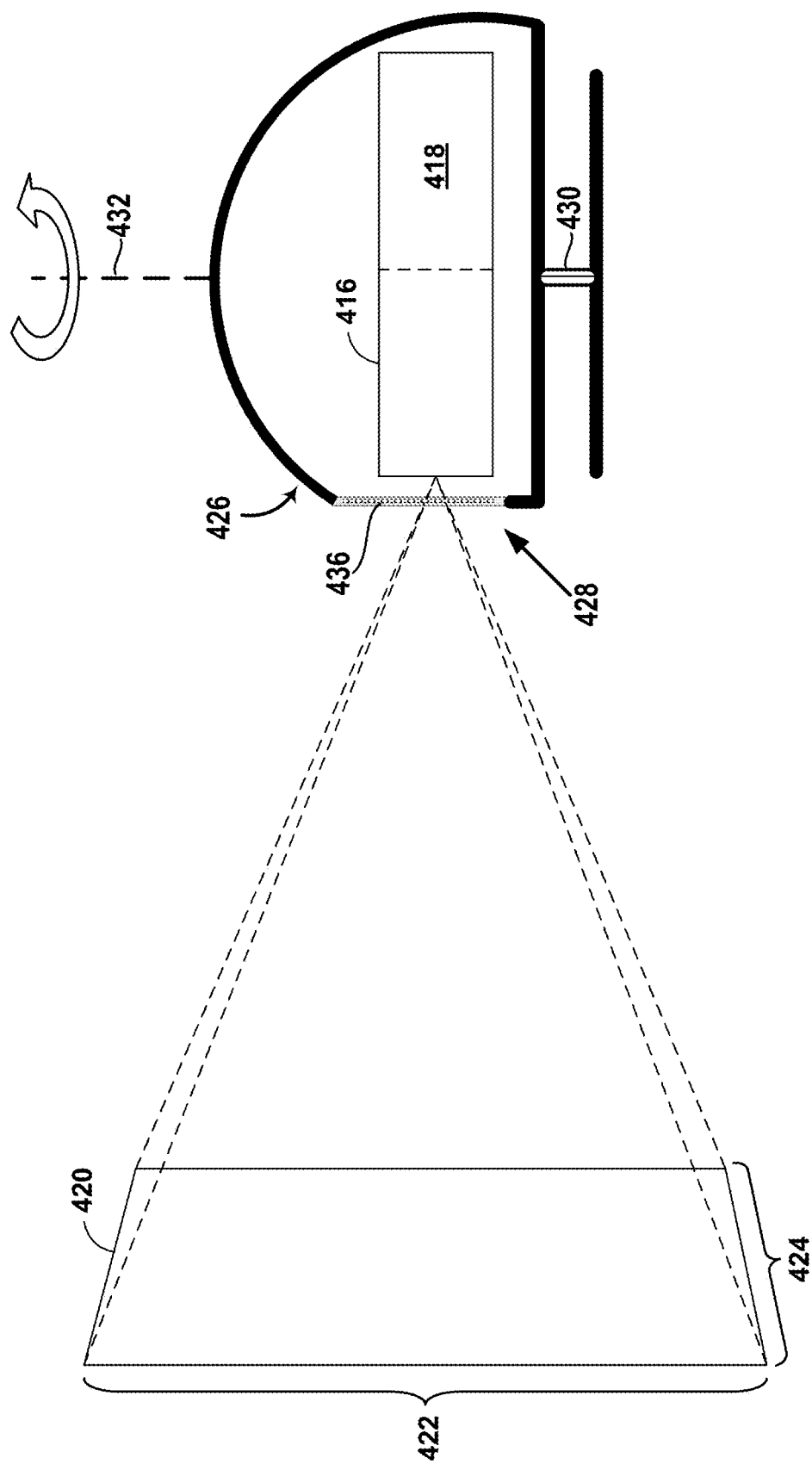
FIG. 4C illustrates an arrangement of a camera and an electrochromic window, according to an example implementation.

FIGS. 4B and 4C next illustrate example arrangements of a camera and a light-control feature.

As an initial matter, FIGS. 4B and 4C each respectively illustrate an imaging operation of an apparatus that includes an optical system 416 (e.g., a lens) and an image sensor 418. The image sensor 418 could be in a camera, such as camera system 400 shown in FIG. 4A. The optical system 416 provides an overall field of view 420 to the image sensor 418. The overall field of view 420 includes a vertical field of view 422 and a horizontal field of view 424. The overall field of view 420 corresponds to the largest angular extent that the image sensor 418 can image via the optical system 416.

Additionally, FIGS. 4B and 4C each respectively illustrate that the optical system 416 and the image sensor 418 could be disposed within a housing 426. The housing 426 is shown to include an aperture 428 (e.g., a transparent aperture) through which the image sensor 418 could capture images of the vehicle's environment. Additionally, the housing 426 could be coupled to a rotating platform 430, which may rotate about axis 432, thereby also causing rotation of the housing 426, the optical system 416, and the image sensor 418. In this way, the image sensor 418 to capture images of various portions of the vehicle's environment.

In another implementation, however, any one of the optical system 416, image sensor 418, and the housing 426 may be substantially fixed (e.g., to a part of a vehicle), and thus may not necessarily rotate about an axis. For example, the image sensor 418 may be fixed to the vehicle, so as to obtain images of certain portion(s) of the vehicle's environment. Other implementations are also possible.

In line with the present disclosure, FIGS. 4B and 4C also illustrate light-control features. For example, FIG. 4B illustrates a wiper 434, which is coupled to an outside portion of the housing 426, and specifically nearby the aperture 428. With this arrangement, a computing system could adjust position of the wiper 434 relative to the image sensor 418 (e.g., adjust position of the wiper 434 relative to the field of view 420), so as to control the extent of external light encountered by the image sensor 418 and/or by the optical system 416. In another example, FIG. 4C illustrates an electrochromic window 436 that is incorporated within the aperture 428, thereby causing the image sensor 418 to capture images of the environment through the electrochromic window 436. And as further discussed herein, the electrochromic window 436 may have adjustable light transmission properties. With this arrangement, a computing system could adjust light transmission properties of the electrochromic window 436, so as to control the extent of external light encountered by the image sensor 418. Other illustrations are also possible.

IV. Sun-Aware Vehicle Routing

In line with the discussion above, an image capture device may be any device capable of generating image data representative of an environment (e.g., capture image(s) of the environment), such as of an environment around a vehicle (e.g., vehicle 100), for instance. Generally, an image capture device could be or could otherwise be referred to as a camera (e.g., camera 130), a camera system (e.g., camera system 400), and/or an image sensor (e.g., image sensor 406 of FIG. 4A), among other options. Moreover, an image capture device could be coupled to a vehicle in any feasible manner, such as using the arrangements described herein, among others.

In some situations, as noted, quality of images captured by an image capture device may degrade due to sunlight encountered by the image capture device, which may prevent the image capture device from generating image data of sufficient quality to be used as basis for autonomous operation of the vehicle. In many cases, such degradation in image quality may occur in a situation where the sun is within the field of view of the image capture device, and especially when the sun is substantially proximate, from a perspective of the image capture device, to a target object of which an image is to be captured. In any case, sunlight could degrade quality of image(s) in various ways.

For example, the image capture device may encounter blooming, which is a phenomenon where excessive light could cause bright patches in an image (e.g., light streaks out from a light source captured in the image due to a significant charge at a given pixel). In another example, the image capture device may encounter stray light, which is light that travels through an optical system of the image capture device in a way that was not intended in the design (e.g., false light increasing a signal measured at some wavelengths). In yet another example, the image capture device may encounter glare, which is generally a phenomenon where high-intensity light impairs visibility of features in an image. In yet another example, the image capture device may encounter lens flare, which is a phenomenon where light is scattered or flared in an optical system of the image capture device, thereby producing undesirable effects on an image. In yet other examples, the image capture device may encounter oversaturation, overexposure, underexposure (e.g., underexposure of an area of interest in an image due to sunlight-triggered auto exposure settings), and/or degradation in image resolution, among other possibilities.

Figure 5A:
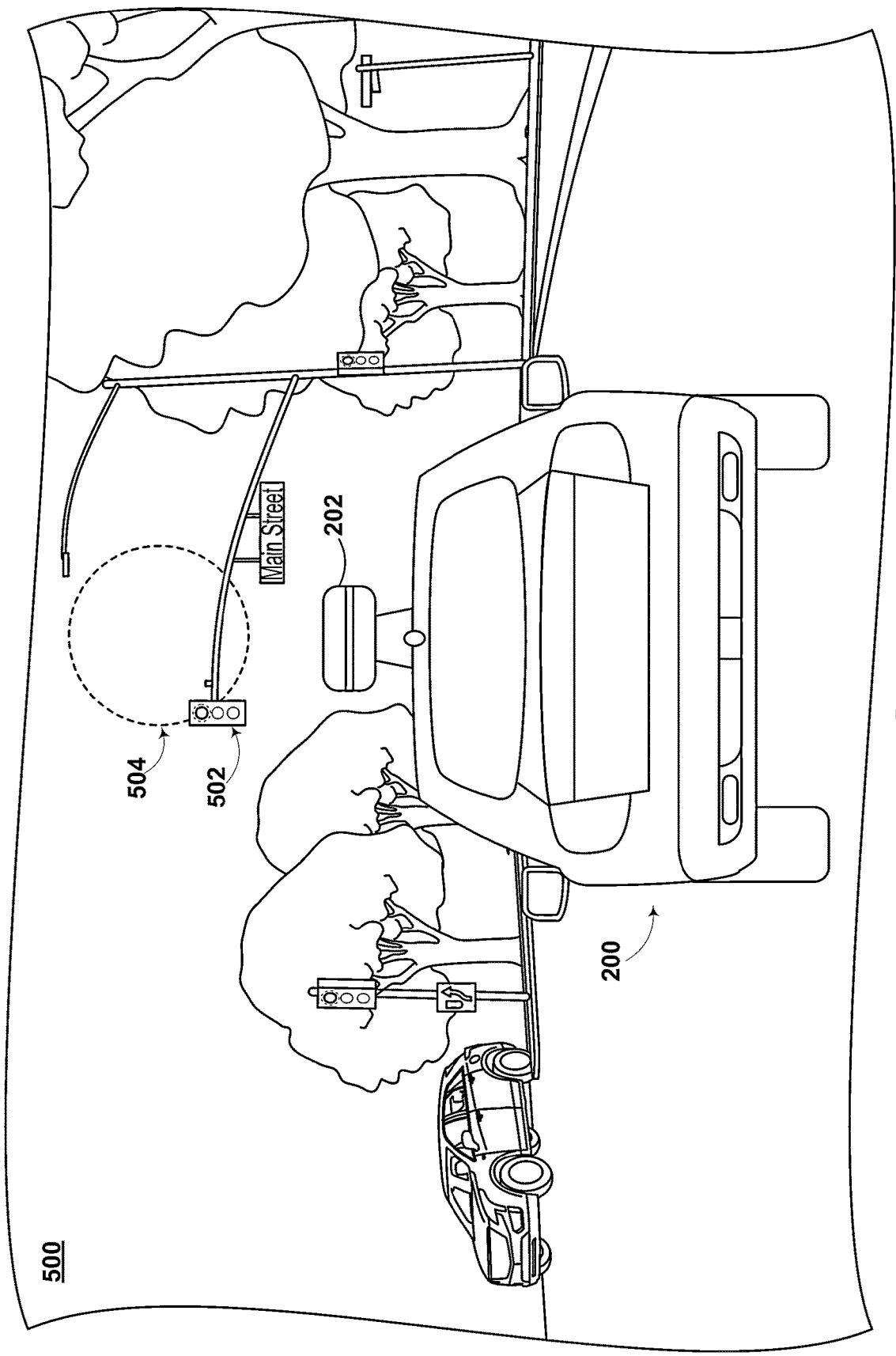
FIG. 5A illustrates an autonomous vehicle near a traffic signal.
Figure 5B:
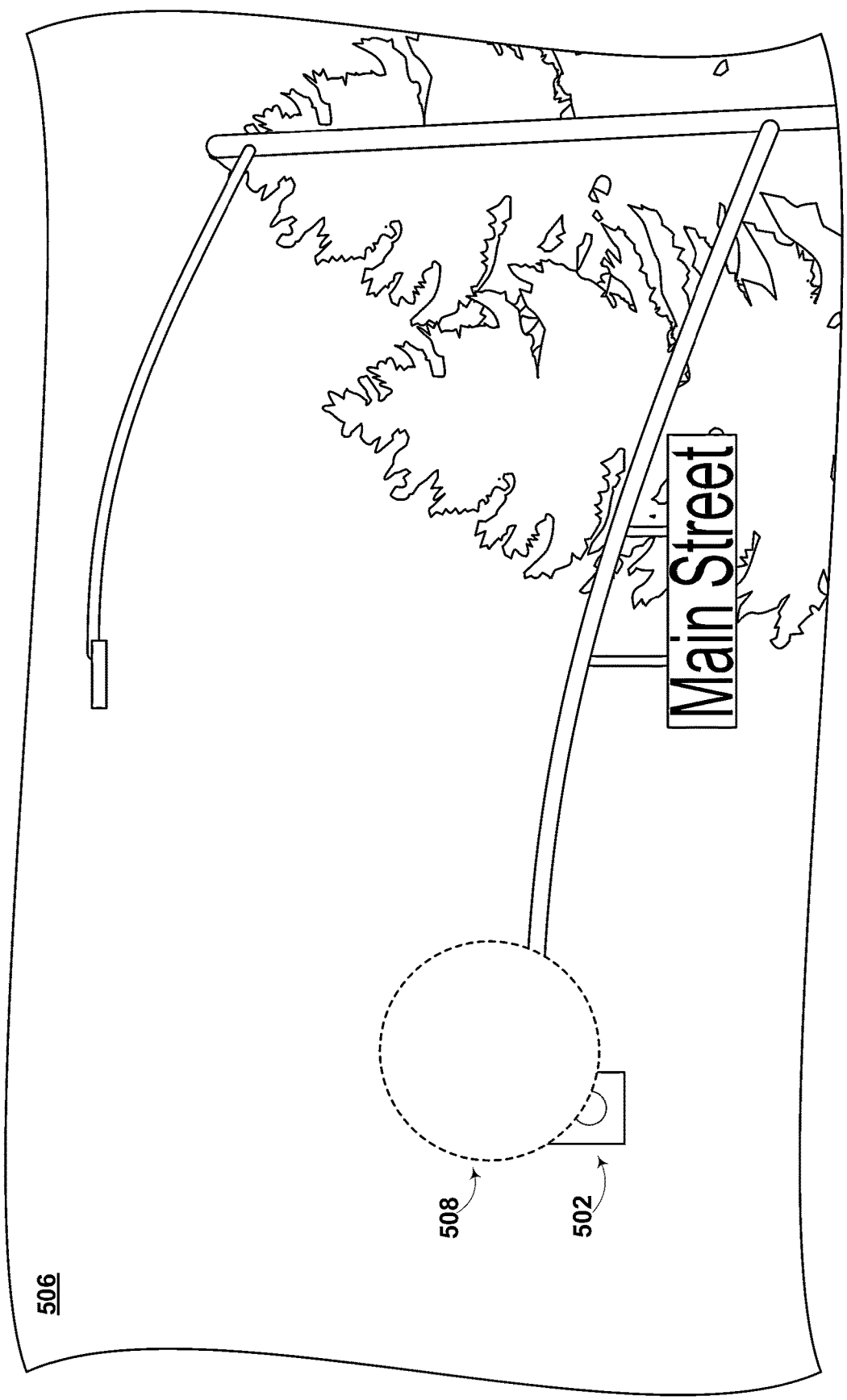
FIG. 5B illustrates sunlight glare obscuring details of the traffic signal from the perspective of an image capture device of the autonomous vehicle.

FIGS. 5A-5B illustrate an example of a situation in which sunlight could prevent an image capture device of an autonomous vehicle from capturing images of sufficient quality to be used as basis for autonomous operation of the vehicle.

FIG. 5A shows a situation where the vehicle 200 arrives at an intersection 500 having a traffic signal 502. In this situation, a computing system of the vehicle 200 may operate an image capture device, such as a front-facing camera of the sensor unit 202, to capture image(s) of the intersection 500. Once image(s) are captured, the computing system may attempt to use the captured image(s) as basis for determining a color or state of the traffic signal 502 and thus as basis for determining subsequent autonomous operations that the vehicle should carry out at the intersection 500. For instance, as shown in FIG. 5A, a top light (e.g., red light) of the traffic signal 502 is emitting light, but the middle and bottom lights of the traffic light 502 are not emitting light, thereby serving as an indication that vehicle(s) should stop at that part of the intersection 500. As such, the computing system may attempt to use the captured image(s) as basis for determining whether or not the top light of the traffic signal 502 is emitting light and thus whether the computing system should operate the vehicle 200 to stop at the intersection 500.

Unfortunately, however, the position of the sun 504 from the perspective of the vehicle's image capture device may prevent the image capture device from capturing an image of the traffic signal 502 that is of sufficient quality to be used as basis for determining a color or state of the traffic signal 502. In particular, as shown, the sun 504 is positioned substantially proximate to or behind the traffic signal 502 from the perspective of the image capture device (e.g., in the field of view of the front-facing camera of the sensor unit 202). This situation may cause the image capture device to encounter sunlight of sufficient intensity to cause blooming and/or to degrade image resolution, among other options. As a result, the image capture device may not be able to capture image(s) of the traffic signal 502 that are of sufficient quality to be used as basis for determining a color or state of the traffic signal 502.

For instance, FIG. 5B illustrates an example of an image 506 captured by the vehicle's image capture device during the above-described situation. As shown, the traffic signal 502 is not fully visible in the image 506 due to an image artifact 508, which is caused by the sun 504 being positioned in the field of view of the image capture device and being positioned behind or substantially proximate to the traffic signal 502 from the perspective of the image capture device. So if the computing system attempts to use the captured image 506 as basis for determining a color or state of the traffic signal 502, the computing system may not be able to use the image 506 as basis for determining that the top light of the traffic signal 502 is emitting light. Consequently, the computing system may not determine that vehicle 200 should stop at the intersection 500 or may experience a delay in determining that vehicle 200 should stop at the intersection 500 or may determine that the vehicle should stop as a default if it cannot determine with sufficient confidence the traffic signal state, which may then prevent the computing system from timely operating the vehicle 200 to stop or otherwise as expected at the intersection 500, among other undesirable outcomes. Other examples are also possible.

Disclosed herein is an approach to help reduce or prevent situations where sunlight may degrade quality of image(s) being captured by a vehicle's image capture device. The disclosed approach may specifically involve routing the vehicle in a manner that helps avoid a situation where the sun is in the field of view of the vehicle's image capture device and is proximate to an object within that field of view from the perspective of the image capture device. In practice, this approach could be a proactive approach, so as to provide for advance determination of a route that avoids the above-described situation(s).

In accordance with the disclosed approach, a computing system of the vehicle may determine an expected position of the sun relative to a geographic area. Generally, a geographical area may be one or more spatial points on earth, such as a two-dimensional or a three-dimensional space on earth. In a specific example, a geographic area could be a particular city and/or a particular neighborhood, among other options. Moreover, a position of the sun relative to a geographic area could be a position of the sun "in the sky" from the perspective of one or more locations in the geographic area.

More specifically, the position of the sun relative to the geographic area could be defined in various ways. For instance, a particular location in the geographic area could be a reference point and the position of the sun could be defined as a set of angles with respect to that reference point. By way of example, the sun could be defined according to an altitude and azimuth of the sun with respect to the reference point. The altitude may define an angle up from the horizon, where zero degrees (0°) altitude corresponds to a local horizon from the perspective of the reference point and where a 90° altitude is "straight up" from the reference point towards the sky from the perspective of the reference point. Whereas, the azimuth may define an angle along the horizon, where 0° azimuth corresponds to "north" and where azimuth angles increase in a clockwise fashion (e.g., 90° is "east", 180° is "south", and 270° is "west"). As such, altitude and azimuth could be used to describe position of the sun with respect to a given location.

Moreover, when the computing system determines an expected position of the sun relative to a geographic area, the computing system could determine the expected position of the sun at one or more times. These time(s) could be time(s) of the day, time(s) of the month, and/or time(s) of the year, among other options. In any case, when a set of angles is used to describe position of the sun, that set of angles may describe position of the sun with respect to a given location at a given time. For example, position of the sun from the perspective of a particular location at 7:25 am on Jun. 15, 2016 was 17° altitude and 73.3° azimuth. Whereas, position of the sun from the perspective of that same particular location at a 8:10 am on Jun. 15, 2016 was 25.7° altitude and 79.3° azimuth. Other examples are also possible.

In this regard, the computing system may use various techniques to determine an expected position of the sun relative to a geographic area. For example, the computing system could receive and use ephemeris data to determine the sun's position in the sky over a given location at a given time. In practice, ephemeris data may relate to one or more expected positions of the sun relative to one or more locations in a geographic area at one or more times. Further, the computing system may receive such ephemeris data by referring to data storage containing an almanac for the ephemeris data and/or by engaging in communication with a central server containing the almanac, among other options. In another example, the system may estimate a position of the sun based on image data from the image capture device (e.g., estimate the sun's azimuth and elevation based on the image data). Other examples are also possible.

Once the computing system determines an expected position of the sun relative to a geographic area, the computing system could use at least the determined expected position as basis for making a determination that travel of the vehicle through one or more locations within the geographic area (e.g., at one or more particular times) is expected to result in the sun being proximate to an object within a field of view of the image capture device from a perspective of the image capture device. In line with the discussion above, this determination may correspond to a determination that travel of the vehicle through the one or more locations is expected to cause the image device to generate image data having threshold low image quality (e.g. images encountering blooming, oversaturation, overexposure, and/or degraded resolution).

More specifically, as an initial matter, proximity of the sun to an object from the perspective of the image capture device could be defined in various ways. In one example, the sun could be considered proximate to the object from the perspective of the image capture device if both the sun and the object are in the field of view of the image capture device. In another example, the sun could be considered proximate to the object from the perspective of the image capture device if the sun is within a threshold distance away from the object from the perspective of the image capture device (e.g., a "center" of the sun is less than one centimeter away from an "edge" of the object from the perspective of the image capture device, as could be visible in an image captured by the device from that perspective). In yet another example, the sun could be considered proximate to the object from the perspective of the image capture device if position of the sun at least partially overlaps position of the object from the perspective of the image capture device (e.g., the sun is behind the object from the perspective of the image capture device). Other examples are also possible.

Generally, the computing system could use various techniques to make the determination based on the expected position of the sun relative to the geographic area.

In one implementation, the computing system could use the expected position of the sun relative to particular location in the geographic area (e.g., a particular portion of a particular intersection) as well as a known and/or predicted position of an object relative to the particular location as basis for making the determination. Generally, the computing system could determine or predict the position of the object in various ways. For instance, the computing system may refer to a map that specifies respective positions of a plurality of objects in the geographic area. Additionally or alternatively, the computing system may predict a spatial position of the object based on known characteristics of the object. For example, traffic light may be regulated to be at certain heights and intersections may be of certain width(s)

depending on a number of lanes, and thus the computing system could predict a spatial position of a traffic light in accordance with such standards. In any case, the computing system could compare the position of the object to the expected position of the sun and could make the determination based on the comparison.

By way of example, the computing system could determine that the expected position of the sun at a given time relative to a particular spatial position in a particular portion of a particular intersection (e.g., a particular height above a specific lane on a specific side of the intersection) is 2° altitude and 90° azimuth, which means that the sun is in the east and substantially in the local horizon from the perspective of the particular spatial position in the particular portion of the intersection. Additionally, the computing system could determine that a traffic signal in the intersection is positioned at 88° azimuth relative to the particular portion of the particular intersection and could also determine that the traffic signal in the local horizon from the perspective of the particular spatial position in the particular portion of the intersection, as most objects in the intersection are likely in the local horizon.

In this example, the computing system could thus make a determination that (i) both the sun and the traffic signal are expected to be in the local horizon from the perspective of the particular spatial position in the particular portion of the intersection at the given time and that (ii) an azimuthal difference between the 88° azimuth of the traffic signal and the 90° azimuth of the sun is expected to be less than a threshold difference (e.g., an azimuthal difference that is less than 4°) from the perspective of the particular spatial position in the particular portion of the intersection at the given time. And this determination may correspond to a determination that that travel of the vehicle through the particular portion of the intersection at the given time, with the image capture device expected to be substantially at the particular spatial position and oriented towards the traffic signal, is expected to result in the sun being proximate to the traffic signal within a field of view of the image capture device from a perspective of the image capture device. Other examples are also possible.

In some implementations, in addition to the expected position of the sun and the known position of the object, the computing system could also use other parameters to make the above-mentioned determination.

In one case, the computing system could determine expected orientation(s) and/or expected position(s) of the image capture device during travel of the vehicle through one or more locations in the geographic area. The computing system could determine the orientation(s) and/or position(s) in various ways, such as based on (i) orientation(s) and/or position(s) of the vehicle during travel of the vehicle through the one or more locations in the geographic area (e.g., in accordance with road geometry and/or direction of travel on the road) and (ii) stored information specifying an arrangement of the image capture device relative to the vehicle (e.g., height of the image capture device relative to the road and/or positioning offset of the image capture device relative to a centerline of the vehicle). In any case, the computing system could use these expected orientation(s) and/or position(s) as further basis for making the determination.

For example, the computing system could determine that the image capture device's field of view is oriented in direction corresponding to a forward direction of travel of the vehicle and that the image capture device is positioned on a roof of the vehicle at a height of 1.2 meters above a ground surface on which the vehicle is traveling. Then, based on the orientation of the image capture device relative to direction of travel of the vehicle and on the above-mentioned known position of the traffic signal, the computing system could determine that travel of the vehicle through the particular portion of the intersection and towards the traffic signal is expected to cause the traffic signal to be in the field of view of the image capture device. Additionally, based on an expected position of the image capture device relative to the particular portion (e.g., 1.2 meters above the ground surface of the particular portion) and on the known position of the traffic signal relative to the particular portion, the computing system could determine an expected position of the traffic signal relative to the image capture device. Further, based on the expected position of the image capture device relative to the particular portion and on the expected position of the sun relative to the particular portion, the computing system could determine an expected position of the sun relative to the image capture device. As such, the computing system could make the above-mentioned determination by determining that the traffic signal is expected to be in the field of view of the image capture device and by determining that the expected position of the traffic signal relative to the image capture device is within a threshold distance away from the expected position of the sun relative to the image capture device. Other examples are also possible.

In another case, the computing system could determine expected orientation(s) of the object relative to the image capture device during travel of the vehicle through one or more locations in the geographic area. The computing system could determine the orientation(s) in various ways, such as by referring to a map that specifies respective orientations of a plurality of objects in the geographic area. As such, in addition to or instead of considering a position of the object relative to a location in the geographic area (or more specifically relative to the image capture device), the computing system could use an expected orientation(s) of the object as further basis for making the determination. Namely, the computing system could more specifically determine whether a specific part of the object is expected to be within the field of view and thus whether the sun is expected to be proximate to that specific part from the perspective of the image capture device.

For example, the computing system could determine an orientation of the traffic signal relative to the particular portion of the intersection, such as by determining that lights of the traffic signal are oriented towards the particular portion. Based on the determining that light of the traffic signal are oriented towards the particular portion and on the determining that the traffic signal is expected to be in the field of view of the image capture device, the computing system could determine that the lights of the traffic signal are expected to be in the field of view of the image capture device. So by determining that the sun is expected to be proximate to the traffic signal from the perspective of the image capture device and by determining that the lights of the traffic signal are expected to be in the field of view of the image capture device, the computing system may more specifically determine that the sun is expected to be proximate to the lights of the traffic signal from the perspective of the image capture device. Generally, this determination may correspond to a determination that travel of the vehicle through the particular portion of the intersection at the given time is expected to prevent the image capture device from obtaining image(s) that would allow the computing system to determine a color or state represented by the traffic signal's lights. Other examples are also possible.

In yet another case, the computing system could determine one or more parameters of the image capture device. The computing system could determine such parameter(s) in various ways, such as by engaging in communication with the image capture device to obtain its parameter(s). As such, the computing system could use these parameters(s) as further basis for making the determination.

For example, the computing system could determine the overall field of view of the image capture device, such as by determining that the image capture device is a "wide angle" camera having a field of view of a particular width. This overall field of view may be an additional factor based on which the computing system could determine that the traffic signal is expected to be within the field of the view of the image capture device during travel of the vehicle through the particular portion of the intersection. For instance, the computing system could determine that the particular width of the wide angle camera is sufficiently great to allow the camera to cause the traffic signal to be within the field of the view of the camera during travel of the vehicle through the particular portion of the intersection. In any case, given that the computing system could use the overall field of view as an additional factor in determining that the traffic signal is expected to be within the field of the view of the image capture device and given that the above-mentioned determination is based at least in part on the computing system determining that an object is expected to be within the field of the view, then the overall field of view may thus serve as additional factor for making the determination at issue. Other examples are also possible.

In yet another case, the computing system could determine characteristic(s) related to other object(s) in the vicinity of the object at issue (e.g., the traffic signal), and could use these characteristic(s) as further basis for making the determination. For instance, the computing system could use map data to identify the other objects in the vicinity and to determine characteristics of these other objects, such as position, orientation and/or height of a given object. And the computing system could evaluate these characteristics as part of the process of making the determination.

For example, the computing system could make a determination that travel of the vehicle through a particular location within the geographic area is expected to result in the sun being proximate to a traffic signal within a field of view of the image capture device from a perspective of the image capture device. But the computing system may also determine that trees in the vicinity of the traffic signal are of a position and height that will result in occlusion of the sun from the perspective of the image capture device, thereby preventing the above-mentioned issues. Alternatively, the computing system may determine that trees in the vicinity of the traffic signal are of a position and height that does not result in occlusion of the sun from the perspective of the image capture device, and thus may determine that the determination is valid. Other examples are also possible.

In yet another case, the computing system could make the determination at issue based on historical data related to previously made determinations. For example, the computing system may have previously determined that travel of the vehicle through a particular location within the geographic area, when the sun is at a particular position, resulted in the sun being proximate to an object within a field of view of the image capture device from a perspective of the image capture. As such, if the computing system again determines that the sun is or is expected to be at the particular position, then the computing system may use the previous determination as basis for making another determination that travel of the through the particular location is expected to again result in the sun being proximate to the object within the field of view of the image capture device from the perspective of the image capture.

In yet another case, the computing system could make the determination at issue based on elevation data indicative of surface elevations in a geographical area. For example, the computing system may utilize the elevation data to determine the spatial orientation the vehicle would have when traveling through a particular location in the geographical area. And based at least on the determined spatial orientation of the vehicle, the computing system could determine an orientation of the image capture device, which could be used by the computing system as a factor in making the determination as discussed herein. Other cases and examples are also possible.

Once the computing system makes a determination that travel of the vehicle through one or more locations within the geographic area is expected to result in the sun being proximate to an object within a field of view of the image capture device from a perspective of the image capture device, the computing system may respond to the determination by generating a route for the vehicle in the geographic area that avoids travel of the vehicle through the one or more locations at issue. Generally, the route could be defined as a driving path for the vehicle from a first to a second location in the geographic area, among other possibilities.

More specifically, if the computing system determines that travel of the vehicle through a particular location in the geographic area at a given time is expected to cause the sun to be proximate to an object within the field of view of the image capture device, then the computing system may responsively carry out operations to prevent travel of the vehicle through the particular location at the given time. For instance, assuming that the computing system executes a particular route planning algorithm to determine a route for the vehicle, the computing system may add an "avoidance" constraint to the route planning algorithm that designates the particular location as a location that the vehicle should avoid at the given time. Thus, the route planning algorithm may determine the route based on one or more factors while satisfying the avoidance constraint. For example, the route planning algorithm may determine a route based on the route being the shortest possible route to a target location (i.e., in terms of distance traveled by the vehicle) and based on the route avoiding travel of the vehicle through a particular location at the given time. Other examples are also possible.

In this regard, when the computing system generates a route that avoids travel of the vehicle through one or more locations, these one or more locations could take various forms. In one example, the one or more locations may include a portion of a particular traffic lane, and thus the computing system may generate a route that avoids travel of the vehicle through at least that portion of that particular traffic lane (e.g., a slight movement of the vehicle within the particular traffic lane that avoids travel through the portion). In another example, the one or more locations may include a portion of a particular road, and thus the computing system may generate a route that avoids travel of the vehicle through at least that portion of that particular road. In yet another example, in line with the examples provided above, the one or more locations may include a portion of a particular intersection, and thus the computing system may generate a route that avoids travel of the vehicle through at least that portion of that particular intersection (e.g., causing the vehicle to stop 3 meters in advance of a stop line). Other examples are also possible.

Once the computing system generates a route for the vehicle in the geographic area that avoids travel of the vehicle through the one or more locations at issue, the computing system may operate the vehicle to travel in accordance with the generated route. In doing so, the computing system may help prevent a situation where the sun is proximate to an object within the field of view of the image capture device from the perspective of the image capture device. In this way, the computing system may reduce or prevent situations where quality of image data degrades due to sunlight encountered by the image capture device. And in turn, the computing system may increase the likelihood of the image capture device generating image data that is of sufficient quality to be used by the computing system as basis for operating the vehicle (e.g., for navigating the vehicle while taking into account objects detected based on the image data).

Figure 6A:
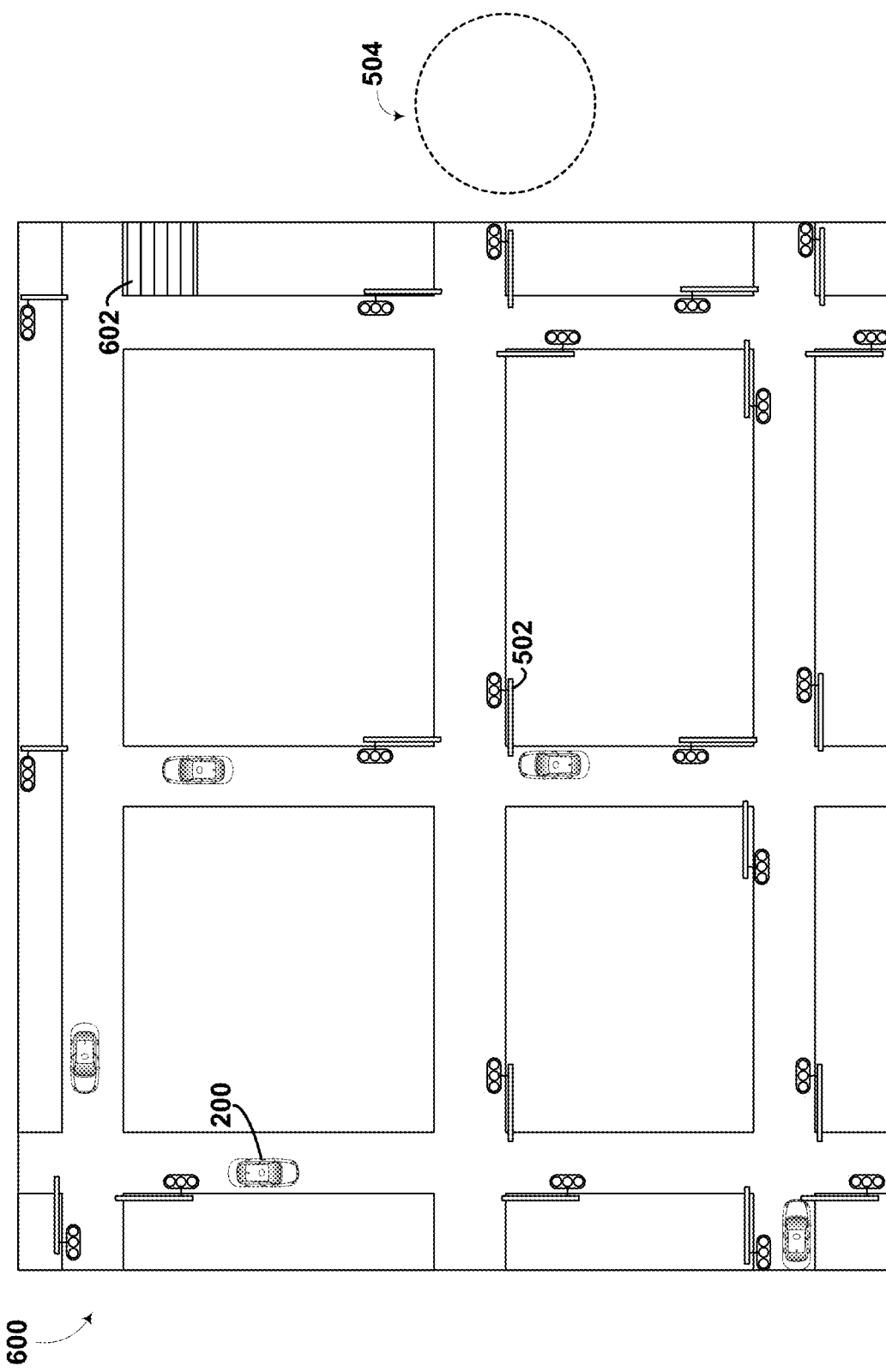
FIG. 6A illustrates a geographic area and a target location for the autonomous vehicle in the geographic area.
Figure 6B:
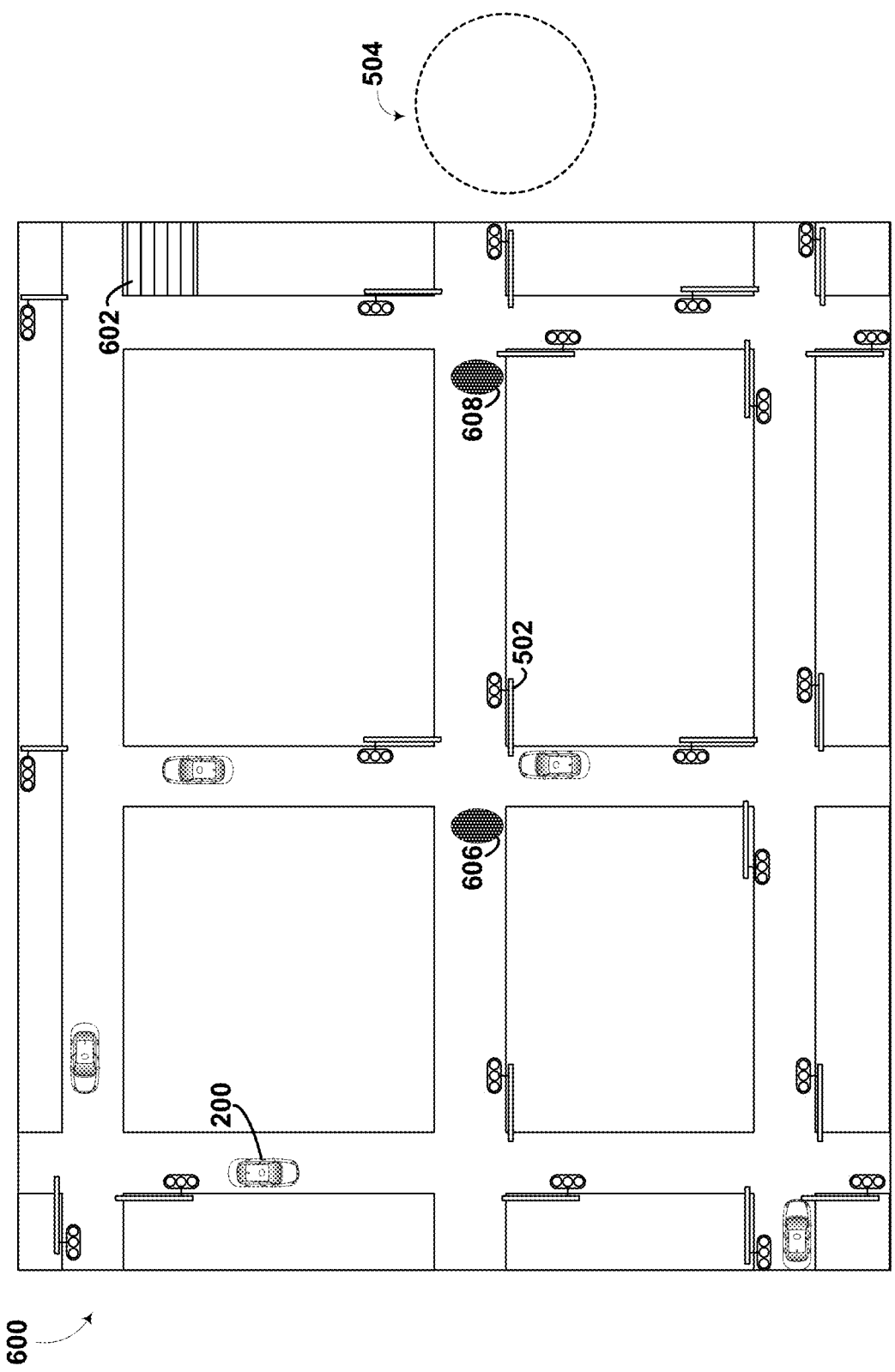
FIG. 6B illustrates one or more locations in the geographic that are to be avoided by the autonomous vehicle, according to an example implementation.
Figure 6C:
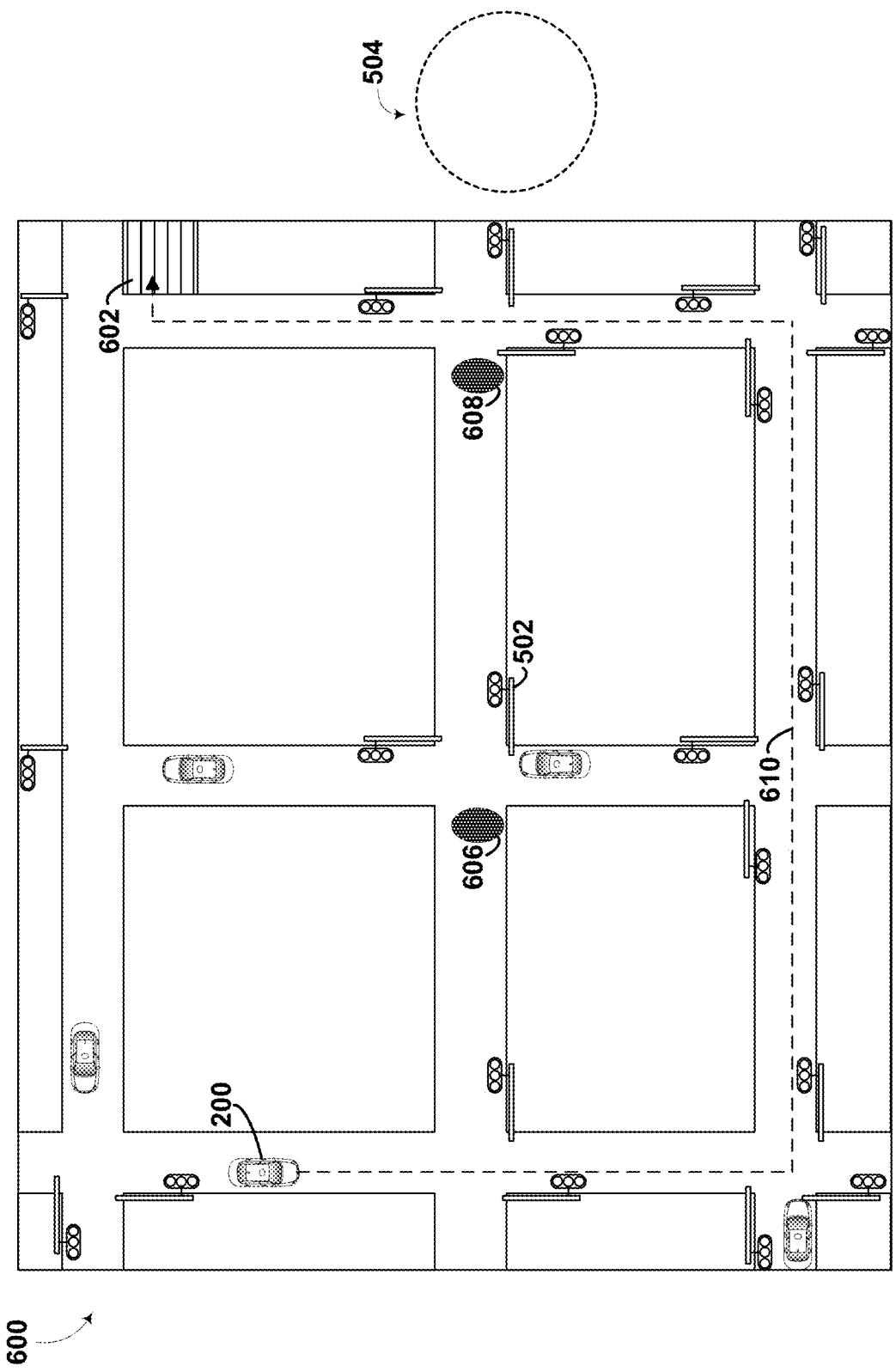
FIG. 6C illustrates a route to the target location that avoids travel of the autonomous vehicle through the one or more locations, according to an example implementation.

FIGS. 6A, 6B, and 6C next illustrate how a vehicle could avoid travel through location(s) where the sun is expected to be proximate to an object with the field of view of the image capture device from a perspective of the image capture device. In particular, FIG. 6A illustrates a position of the sun 504 relative to a geographic area 600 and illustrates that the geographic area 600 includes a plurality of roads, a plurality of traffic signals (e.g., traffic signal 502), and a target location 602 to which the vehicle 200 is expected travel. Next, FIG. 6B illustrates locations 606 and 608, where travel of the vehicle 200 through one of these locations is expected to cause the sun 504 to be proximate to a traffic light within the field of view of the vehicle 200's image capture device from the perspective of the image capture device. For instance, given the position of the sun 504 relative to the traffic light 502, travel of the vehicle 202 through location 606 in the geographic area 600 is expected to cause the sun 504 to be proximate to the traffic light 502 within the field of view of the vehicle 200's image capture device from the perspective of the image capture device. Finally, FIG. 6C illustrates a route 610 for the vehicle to the target location 602 that avoids travel of the vehicle through locations 606 and 608. As such, travel of the vehicle through this route 610 may help reduce or prevent situations where the sun 504 is proximate to a traffic light within the field of view of the vehicle 200's image capture device from the perspective of the image capture device. Other illustrations are also possible.

Furthermore, in some scenario(s), the vehicle may nonetheless encounter a situation where the sun is proximate to an object within the field of view of the image capture device from the perspective of the image capture device. Generally, this object could be the same as or different from the object evaluated during the above-mentioned determination that served as trigger for generating the route at issue. In any case, these scenario(s) could occur for various reasons.

For example, a scenario may arise in which there is no feasible route that completely avoids travel of the vehicle through the above-mentioned location(s), and thus the vehicle may end up traveling through those location(s). As a result, the vehicle may still encounter a situation where the sun is proximate to an object within the field of view of the image capture device from the perspective of the image capture device.

In another example, the computing system may not be able to determine respective positions of all objects in a geographic area, as positions of some objects may not be specified in a map to which the computing system refers, for instance. And because the computing system is not able to determine respective positions of some objects, the computing system may not be able to determine that travel of the vehicle through a given location at a given time may cause the sun to be proximate to a given one of those object in the field of view of the image capture device from the perspective of the image capture device. As a result, during travel of the vehicle according to the generated route, the sun may still end up being proximate to the object in the field of view of the image capture device from the perspective of the image capture device, even though the computing system generated a route in an attempt to help avoid that situation. Other examples are also possible.

Given this, according to the present disclosure, the computing system could proactively or reactively carry out a backup approach to help overcome any issues that may arise in these scenario(s). In particular, the backup approach may involve the computing system determining that the sun is proximate to an object within the field of view of the image capture device from the perspective of the image capture device, and responsively using a light-control feature to control the extent of light encountered by the image capture device, such as by using the light-control feature to block at least a portion of the sun in the field of view of the image capture device from the perspective of the image capture device. This backup approach is described in greater detail below.

V. Controlling Extent of Light Encountered by an Image Capture Device of a Vehicle As noted, a computing system could proactively or reactively carry out a backup approach, such as when a vehicle nonetheless encounters a situation where the sun is proximate to an object within the field of view of the image capture device from the perspective of the image capture device. This backup approach may involve the computing system determining that the sun is proximate to an object within the field of view of the image capture device from the perspective of the image capture device, and responsively using a light-control feature to control the extent of light encountered by the image capture device.

More specifically, a vehicle could be equipped with a light-control feature that is adjustable by a computing system in order to proactively or reactively control the extent of light encountered by the image capture device. Although certain light-control features are described herein by way of example, other light-control features are possible as well without departing from the scope of the present disclosure.

In one case, the light-control feature could be a mechanical device that is movable relative to the image capture device, such as relative to the field of view of the image capture device, among other possibilities. For instance, as further discussed herein, the mechanical device could be positioned in the field of view of the image capture device so as to block an external light source (e.g., the sun) from the perspective of the image capture device, thereby reducing extent of external light encountered by the image capture device. Generally, any feasible mechanical device could be used and that mechanical device could be coupled to the vehicle in any feasible manner.

By way of example, the mechanical device at issue could be a wiper, such as a wiper device typically used to remove rain, snow, ice and/or debris from a windscreen or windshield (e.g., of a vehicle). For instance, the wiper may include an arm (e.g., a metal arm) that pivots at one end and may also include a wiper blade (e.g., rubber blade) attached to the arm. The arm could be powered by a motor (e.g., an electric motor), which could be operable by the computing system of the vehicle, so as to move the arm. With this arrangement, the computing system could operate the wiper to move in any feasible manner and at any feasible speed, such as by moving the wiper back and forth at a particular speed over glass of a windshield, for instance. In this example, the wiper could be coupled to the vehicle in various ways.

In one arrangement, the wiper could be positioned proximate to a windshield of the vehicle, such as proximate to a front or a back windshield of the vehicle, and optionally also could be used to remove rain, snow, ice and/or debris from that windshield. In this arrangement, the image capture device could be positioned within the vehicle so that the image capture device can capture images of the environment of vehicle 200 through the windshield. As a result, the computing system could operate the wiper so that the wiper moves relative to the image capture device, and specifically move relative to the field of view of the image capture device.

In another arrangement, the image capture device could be disposed within a housing that is coupled to the vehicle, and the wiper could be coupled to or otherwise be positioned proximate to that housing. For example, the housing at issue could be a semi-transparent housing of a sensor unit (e.g., sensor unit 202) in which the image capture device is positioned. As such, the image capture device could capture images of the environment of vehicle 200 through a semi-transparent material of the housing. Nonetheless, in this arrangement, the wiper could be coupled to the housing or otherwise be positioned near the housing in a way that allows the computing system to cause a movement of the wiper relative to the image capture device, specifically in order to move the wiper relative to the field of view of the image capture device. Other arrangements are also possible.

In another case, the light-control feature could be a light-control device having adjustable light transmission properties, and the computing system could operate the light-control device. Specifically, the light-control device could be positioned in the field of view of the image capture device, so that the image capture device captures images of the vehicle's environment through the light-control device. With this arrangement, the computing system could adjust light transmission properties of the light-control device, and thus control the amount of light passing through the light-control device. And by controlling the amount of light passing through the light-control device, the computing system may effectively control the extent of light encountered by the image capture device. Moreover, in some implementations, the computing system could selectively adjust light transmission properties of certain parts of the light-control device, which may effectively allow the computing system to control the extent of external light arriving from select regions in the field of view of the image capture device.

In this case, one or more of various light-control devices could be used. For example, the light-control device could be a "smart" glass whose light transmission properties can be altered when voltage, light and/or heat is applied. The smart glass could be an electrochromic device, a photochromic device, and/or a thermochromic device, among others. In the case of the electrochromic device, for instance, the computing system could cause the electrochromic device to change light transmission properties by applying an electrical signal, thereby controlling the amount of light passing through. In practice, changing the light transmission properties of the electrochromic device may involve changing the opacity of the electrochromic device between a transparent and a tinted (semi-transparent) state. Other examples are also possible.

Furthermore, the light-control device could be coupled to the vehicle in any feasible manner. For example, the above-mentioned smart glass could be incorporated within or otherwise replace a windshield of the vehicle, and the image capture device could be positioned within the vehicle so that the image capture device can capture images of the environment of vehicle 200 through the smart glass. In another example, the smart glass could be incorporated within or otherwise replace a material of a housing, and the image capture device could be disposed within the housing, so that the image capture device could capture images of the vehicle's environment through the smart glass in the housing. Other examples are also possible.

In a system arranged as described above, the computing system could detect a trigger to make an adjustment to a light-control feature. Generally, detecting the trigger could involve making a determination that quality of image data generated by an image capture device is or is expected to be lower than a threshold quality due to external light encountered or expected to be encountered by the image capture device. The computing system could make this determination in various ways.

In one case, the computing system could make the above-mentioned determination by using image analysis techniques to evaluate characteristics of a captured image (e.g., a recently captured image), thereby effectively assessing the quality of that image. For example, the computing system could make the determination by determining that a captured image exhibits characteristics of blooming, such as by determining that the image includes a light streak taking the form of a bright column of pixels, for instance. In another example, the computing system could make the determination by determining oversaturation in a captured image. In another example, the computing system could make the determination by determining that an exposure level in a captured image is above a first threshold exposure level or by determining that an exposure level in a captured image is below a second threshold exposure level (e.g., could be the same as or different from the first threshold exposure level). In yet another example, the computing system could make the determination by determining that an image resolution level in a captured image is lower than threshold resolution level. Other examples are also possible.

In another case, the computing system could make the above-mentioned determination by determining that a captured image is not usable for detection and/or identification of an object. For example, the image capture device could capture an image of a vehicle's environment, and the computing system may make a particular determination that the image data representative of that image does not provide information that the computing system can use as basis for detecting and/or identifying an object in the environment. As such, this particular determination could correspond to the above-mentioned determination that quality of image data generated by an image capture device is lower than a threshold quality, possibly due to external light encountered by the image capture device.

In yet another case, the computing system could make the above-mentioned determination by evaluating sensor data received from one or more sensors other than the image capture device. For example, the vehicle could be equipped with a light sensor that provides information about intensity and direction of arrival of external light, and that light sensor could be positioned substantially proximate to the image capture device. With this arrangement, the computing system could make a particular determination that data from the light sensor is representative of light intensity/direction that is expected to or is otherwise known to cause the image capture device to generate image data of insufficient quality. As such, this particular determination could correspond to the above-mentioned determination that quality of image data generated by an image capture device is lower than a threshold quality due to external light encountered by the image capture device.

In yet another case, the computing system could make the above-mentioned determination by determining that the vehicle encountered a situation in which the image capture device cannot or is unlikely to generate image data of sufficient quality. For instance, the computing system could make the determination by determining that a light source is or is expected to be within a field of view of the image capture device, and possibly that the light source is or is expected to be proximate to an object from a perspective of the image capture device. The computing system could do so in various ways.

For example, the computing system could receive and use ephemeris data to determine the sun's position in the sky over a given location at a given time. Given the sun's position over the given location at the given time, the computing system could then determine or predict the sun's position relative to the image capture device's field of view if the vehicle is travelling or is expected to travel in the given location within the geographic area at the given time. Accordingly, the computing system could use this approach to determine or predict that the sun is or is expected to be within a field of view of the image capture device. Moreover, based on a known location of an object (e.g., a traffic signal) at the given location, the computing system could further determine that the sun is or is likely to be proximate to the object at issue from a perspective of the image capture device. Other examples are also possible In yet another case, the computing system could make the above-mentioned determination by determining that the vehicle's location is one at which it is particularly important for the image capture device to generate image data of sufficient quality. To facilitate this, for instance, the computing system may have a list of locations (e.g., a list of intersections) that each have been designated as an "important location" and the computing system could refer to this list to determine that the vehicle is at a location where a light-control feature should be adjusted. As such, the vehicle's determined location could effectively be the trigger to make an adjustment to the light-control feature. Other cases are also possible.

Once the computing system detects a trigger to make an adjustment to the light-control feature, the computing system could responsively make an adjustment to the light-control feature. Generally, the computing system could make this adjustment so as to control the extent of external light encountered or expected to be encountered by the image capture device. For example, making the adjustment could be done to decrease the extent of external light encountered or expected to be encountered by the image capture device. This may be useful in a situation where the image capture device encounters or is expected to encounter a relatively high extent of external light, for instance. In another example, making the adjustment could be done to increase the extent of external light encountered or expected to be encountered by the image capture device. This may be useful in a situation where the image capture device encounters or is expected to encounter a relatively low extent of external light, for instance. Nonetheless, the adjustment could be carried out in various ways.

In one implementation, the adjustment to the light-control feature could be a predetermined adjustment. For instance, the computing system could adjust the light-control device to exhibit predetermined light transmission properties and/or could cause the mechanical device to move to predetermined position(s) relative to the image capture device (e.g., relative to the field of view of the image capture device). In this implementation, the predetermined adjustment could be arranged to cause the extent of encountered external light to exhibit characteristics (e.g., intensity) that can help lead to sufficient image quality. For example, the light-control feature could be adjusted to a predetermined setting that has been found to help prevent blooming and/or saturation, among other options. Other examples are also possible.

In another implementation, the adjustment to the light-control feature could be based on one or more factors. For instance, the computing system could adjust light transmission properties of the light-control device based on one or more factors and/or could cause the mechanical device to move to position(s) that are selected based on one or more factors. Generally, various factor(s) could be used as basis for the adjustment.

In one case, the adjustment to the light-control feature could be based on a position of an external light source from the perspective of the image capture device. In particular, the computing system could determine or estimate a position of an external light source from the perspective of the image capture device, such as by evaluating data from a light sensor, by evaluating recently captured images, and/or by evaluating ephemeris data (assuming that the external light source is the sun), among other options. And the computing system could then adjust the light-control feature based on the determined position of the external light source.

For example, the computing system could cause the mechanical device to move to a position that at least partially overlaps, from the perspective of the image capture device, with the determined position of the external light source, thereby causing the mechanical device to at least partially block the external light source from the perspective of the image capture device. In another example, the computing system could select a part of the light-control device that at least partially overlaps, from the perspective of the image capture device, with the determined position of the external light source, and could then adjust light transmission properties of the selected part (e.g., change opacity of the selected part to a tinted state), thereby at least partially blocking the external light source from the perspective of the image capture device. Other examples are also possible.

In another case, the adjustment to the light-control feature could be based on causing quality of image data generated by the image capture device to be higher than the threshold quality. In particular, the computing system could adjust the light-control feature to cause the extent of encountered external light to exhibit characteristics (e.g., intensity) that lead to certain target outcomes. Generally, these outcomes may include: (i) preventing captured image(s) from exhibiting characteristics of blooming, (ii) preventing captured image(s) from exhibiting characteristics of saturation, (iii) causing an exposure level in captured image(s) to decrease, such as to a level that is below the above-mentioned first threshold exposure level, (iv) causing an exposure level in captured image(s) to increase, such as to a level that is above the above-mentioned second threshold exposure level, and/or (v) causing an image resolution in captured image(s) to increase, such as to a level that is higher than the above-mentioned threshold resolution level.

By way of example, the computing system could determine that an exposure level in image(s) should decrease, such as to a level that is below the first threshold exposure level, for instance. The computing system could determine this target outcome in various ways, such as by evaluating recently captured image(s) and determining that an exposure level in recently captured image(s) is above the first threshold exposure level. Nonetheless, in this example, causing quality of image data to be higher than the threshold quality corresponds to a target outcome of decreasing an exposure level in image(s) to be captured, perhaps to a level that is below the first threshold exposure level. As such, the computing system could specifically adjust the light-control feature to a setting that decreases exposure level in captured image(s), and perhaps to a setting that causes the exposure level to be below the first threshold exposure level. For instance, the computing system could change opacity of the light-control device to decrease an exposure level, and perhaps could change opacity by an extent that causes the exposure level to be below first threshold exposure level. Other examples are also possible.

In either implementation, the computing system could operate the image capture device to generate image data during the adjustment, so as to ideally obtain at least one image that is of sufficient quality to be used as basis for autonomous operation of the vehicle. In particular, the computing system could operate the image capture device to capture a plurality of images during the adjustment. And given that a plurality of images is captured, there may be an increased likelihood of at least one of those images being of sufficient quality. For instance, an image could be considered as being of sufficient quality if the image does not exhibit characteristics of blooming and/or if important object(s) are visible in the image, among other considerations discussed herein. Nonetheless, assuming that at least one of the captured images ends up being of sufficient quality, the computing system could use at least image data corresponding to that image as basis for operating the vehicle.

In a specific example, the computing system could cause a wiper to move incrementally across the image capture device's field of view while the computing system operates the image capture device to capture a plurality of images. In turn, this may result in a plurality of images each showing the wiper in a different position within the image capture device's field of view. In this example, at least one particular image, from among the plurality of images, may be one in which the wiper blocks at least a portion of the external light source (e.g., sun) in the field of view of the image capture device. Ideally, that particular image may also be one in which object(s) (e.g., traffic signal(s)) are visible. For instance, the particular image may be one in which an important object (i) is not blocked by the wiper from the perspective of the particular image and (ii) is detectable and/or identifiable through evaluation of the particular image by the computing system. As such, the computing system could use at least the particular image as basis for operating the vehicle. Other examples are also possible.

Figure 7A:
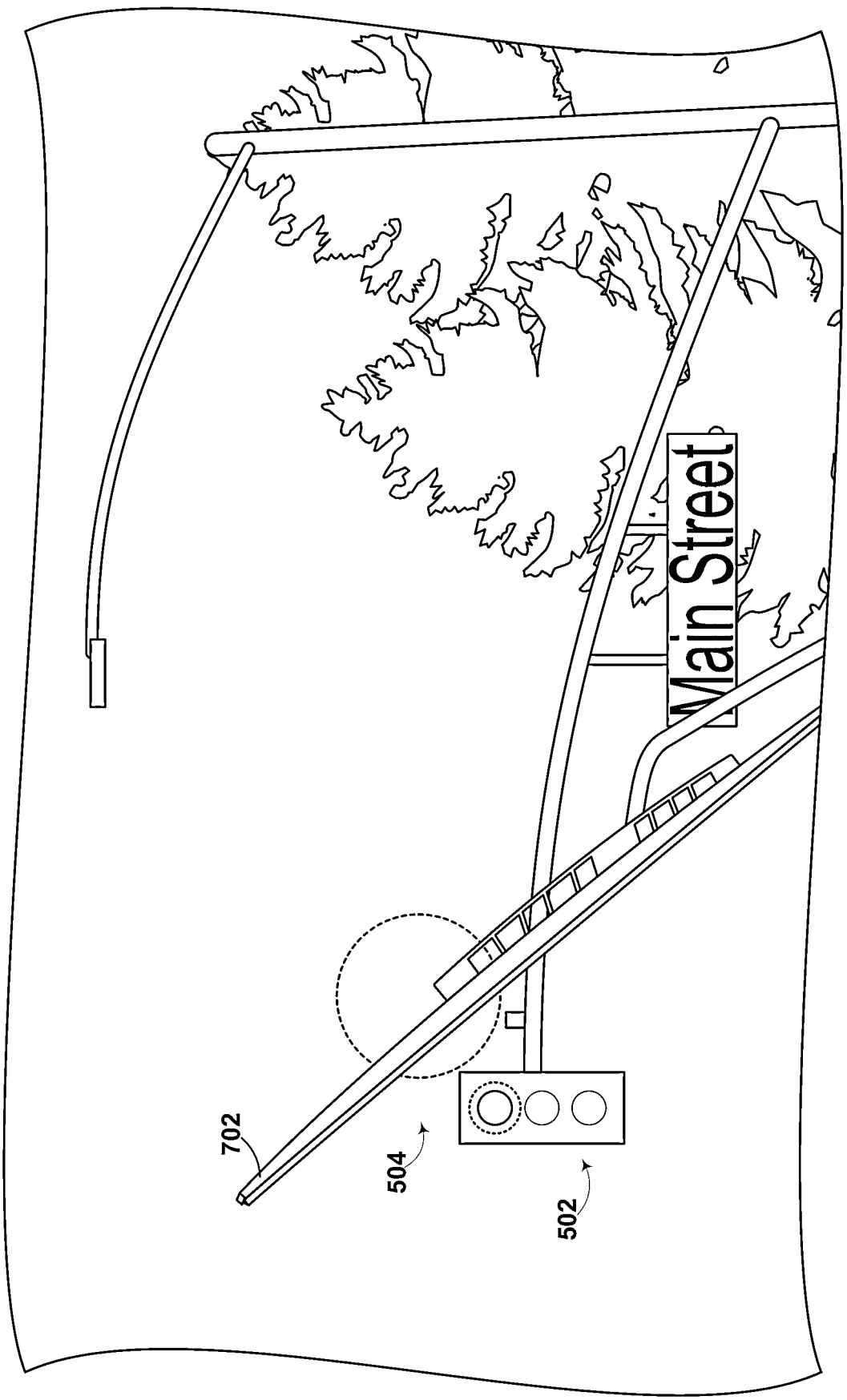
FIGS. 7A and 7B illustrate use of a wiper to control the extent of sunlight encountered by the image capture device of the autonomous vehicle, according to an example implementation.
Figure 7B:
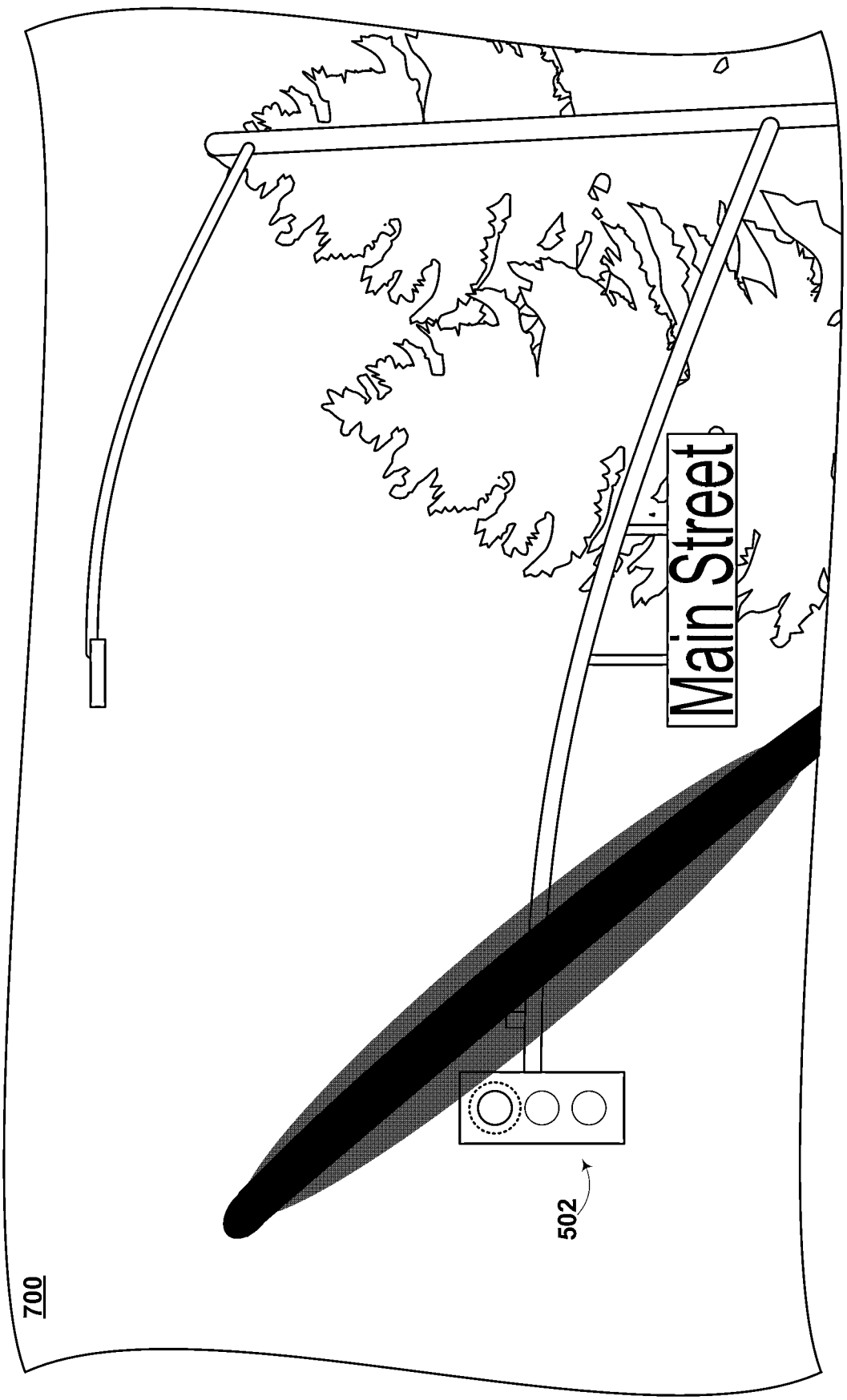
Figure 8:
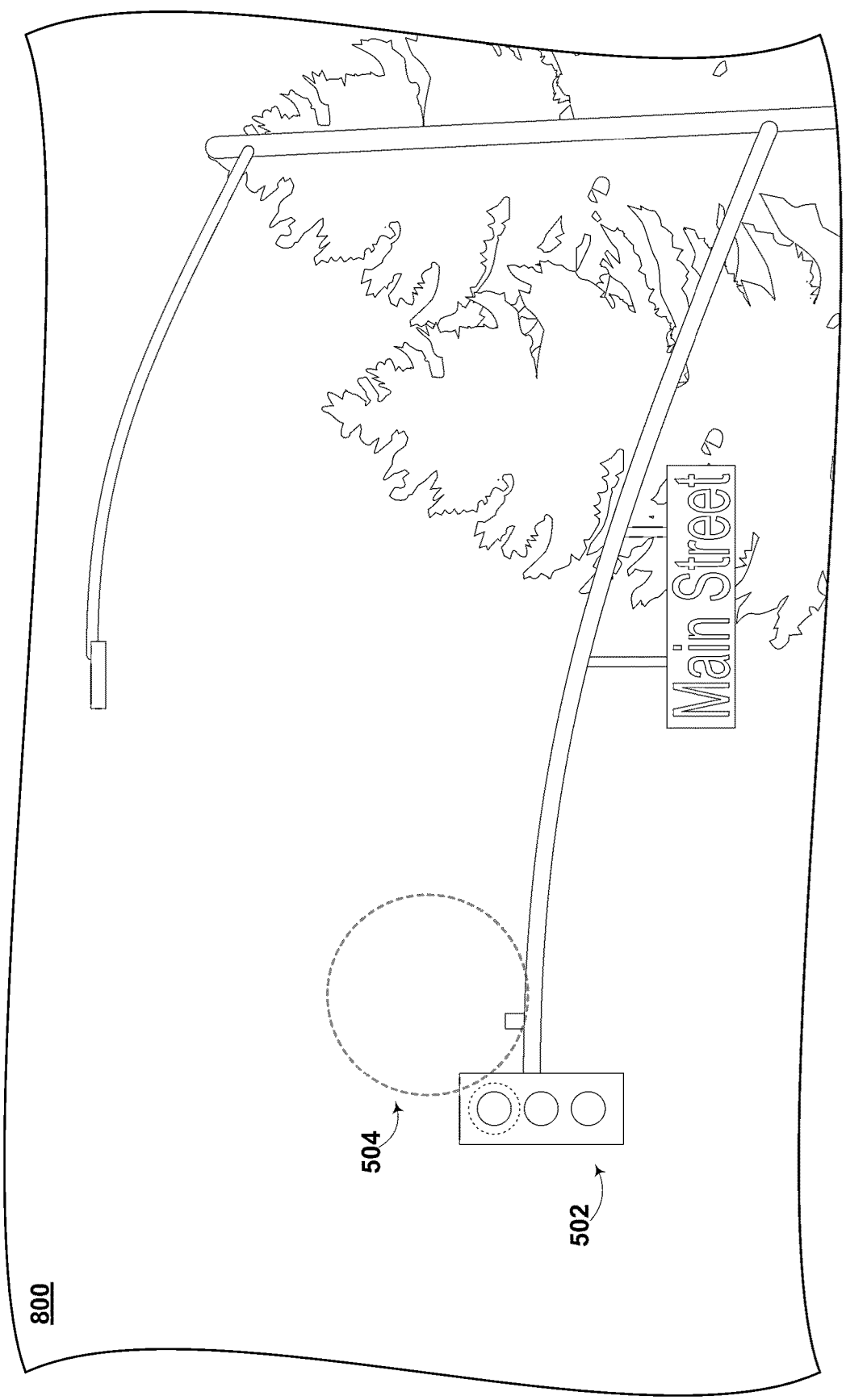
FIG. 8 illustrates use of an electrochromic device to control the extent of sunlight encountered by the image capture device of the autonomous vehicle, according to an example implementation.

FIGS. 7A-7B and 8 illustrate use of light-control feature(s) to control the extent of sunlight encountered by the image capture device of the autonomous vehicle 200.

FIG. 7A illustrates use of a wiper 702 to control the extent of sunlight encountered by the image capture device of the autonomous vehicle 200. And FIG. 7B then illustrates a captured image 700 that ended up being of sufficient quality due to use of the wiper 702.

As shown, the computing system caused the wiper 702 to be positioned within the field of view of the image capture device, so that, from the perspective of the image, the wiper 702 at least partially blocks the sun 504 and does not block the traffic signal 502. As a result, despite the sun 504 being positioned in the field of view of the image capture device and being positioned substantially proximate to the traffic signal 502 from the perspective of the image capture device, movement of the wiper 702 to that position helped prevent an image artifact, thereby leading to sufficient visibility of the traffic signal 502 in the captured image 700. As such, the computing system can use the image 700 as basis for determining whether or not the top light of the traffic signal 502 is emitting light and thus whether the computing system should operate the vehicle 200 to stop at the intersection 500.

Similarly, FIG. 8 illustrates use of an electrochromic device (not shown) to control the extent of sunlight encountered by the image capture device of the autonomous vehicle 200. Specifically, FIG. 8 illustrates a captured image 800 that ended up being of sufficient quality due to use of the electrochromic device. Namely, the computing system changed the opacity of the electrochromic device to a tinted state, so as to reduce the amount of light passing through the electrochromic device and thus reduce the extent of light encountered by the image capture device. As a result, despite the sun 504 being positioned in the field of view of the image capture device and being positioned substantially proximate to the traffic signal 502 from the perspective of the image capture device, this adjustment to the electrochromic device helped prevent blooming, thereby leading to sufficient visibility of the traffic signal 502 in the captured image 800. As such, the computing system can use the image 800 as basis for determining whether or not the top light of the traffic signal 502 is emitting light and thus whether the computing system should operate the vehicle 200 to stop at the intersection 500. Other illustrations are also possible.

In a further aspect, other situations could arise that end up affecting quality of captured images, and the light-control feature could help overcome those other situations as well.

By way of example, the image capture device may be arranged to capture images of an environment through a surface, such as a windshield or glass of a housing, among others. Unfortunately, however, the surface may be exposed to aspects of the environment that can contaminate the surface (e.g., accumulation of dirt or other debris). In some cases, this situation could cause a significant decrease in the extent of external light encountered by the image capture device, which could significantly reduce quality of captured images. Whereas, in other cases, this situation could cause a significant increase in the extent of external light encountered by the image capture device, which could also significantly reduce quality of captured images. In any case, the computing system could evaluate captured images to detect signs of such contamination (e.g., identify accumulation of dirt on the surface). And if the computing system detects signs of contamination, the computing system could responsively operate the wiper to move in an attempt to remove the contamination, thereby providing another way to control the extent of light encountered by the image capture device.

In another example, the image capture device may be arranged to capture images of an environment through a surface, such as a windshield or glass of a housing, among others. Unfortunately, however, the surface may be end up being damaged (e.g., glass may scratch or crack). In practice, the damage could cause a significant decrease in the extent of external light encountered by the image capture device, such as by reducing the amount of light passing through the surface, which could significantly reduce quality of captured images. But in other cases, the damage could cause a significant increase in the extent of external light encountered by the image capture device, such as by increasing the amount of stray light reaching the image sensor, which could also significantly reduce quality of captured images. In any case, the computing system could evaluate captured images to detect signs of such damage (e.g., detect stray light arriving from outside of the field of view of the image capture device). And if the computing system detects signs of damage, the computing system could responsively operate the wiper in an attempt to mitigate the damage. For instance, the computing system could responsively move the wiper to a position that blocks light from passing through the damaged portion of the surface at issue, thereby providing another way to control the extent of light encountered by the image capture device. Other examples are also possible.

VI. Illustrative Method

Figure 9:
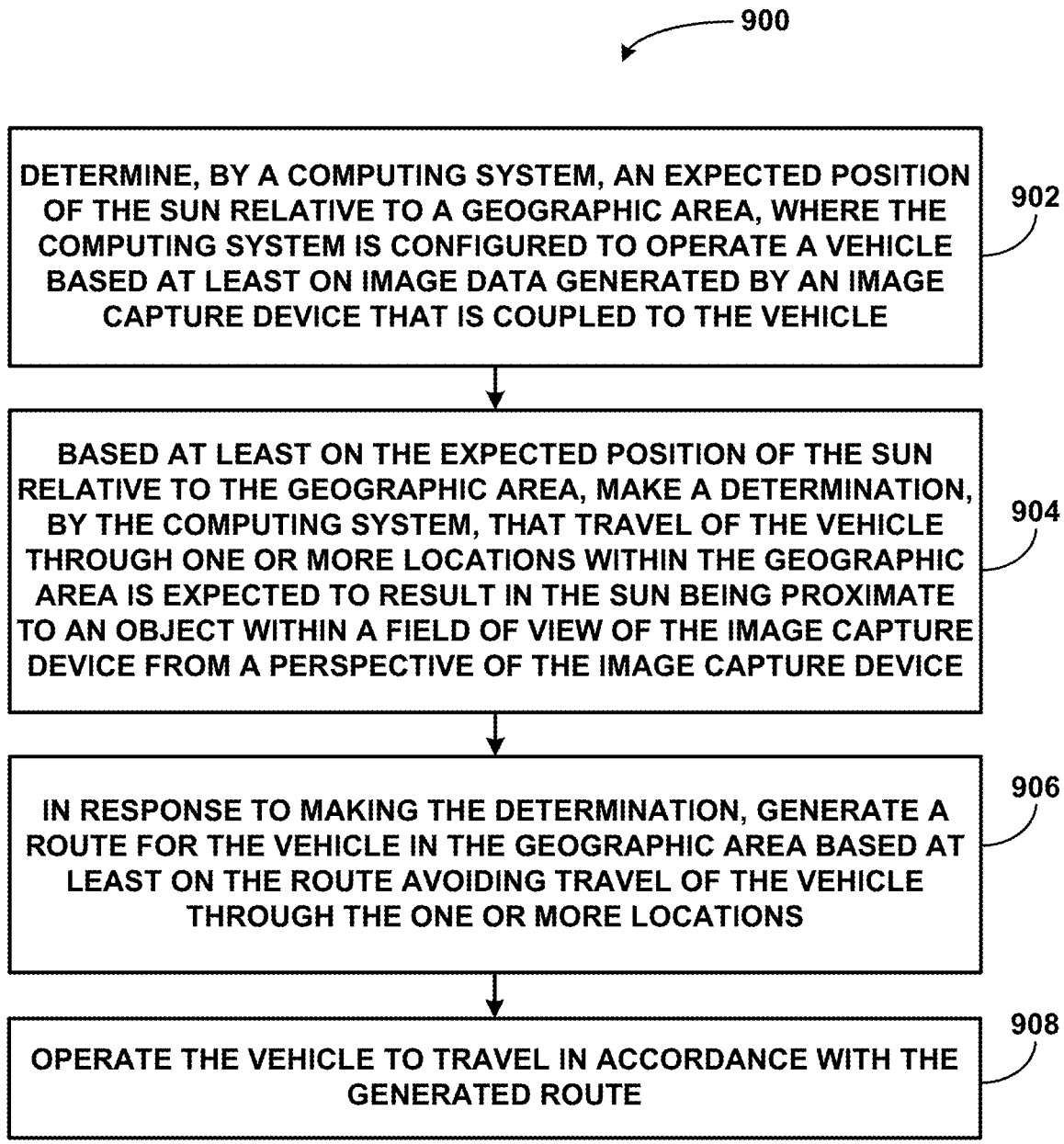
FIG. 9 is a flowchart of a method, according to an example implementation.

FIG. 9 is a flowchart illustrating a method 900, according to an example implementation. Method 900 shown in FIG. 9 (and other processes and methods disclosed herein) presents a method that can be implemented within an arrangement involving, for example, any of the systems shown in FIGS. 1-8 (or more particularly by one or more components or subsystems thereof, such as by a processor and a non-transitory computer-readable medium having instructions that are executable to cause the device to perform functions described herein), among other possible systems.

Method 900 and other processes and methods disclosed herein may include one or more operations, functions, or actions, as illustrated by one or more of blocks 902-908 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, method 900 may involve a computing system determining an expected position of the sun relative to a geographic area. Generally, the computing system may be configured to operate a vehicle based at least on image data generated by an image capture device that is coupled to the vehicle. Additionally, at block 904, method 900 may involve, based at least on the expected position of the sun relative to the geographic area, making a determination, by the computing system, that travel of the vehicle through one or more locations within the geographic area is expected to result in the sun being proximate to an object within a field of view of the image capture device from a perspective of the image capture device. Further, at block 906, method 900 may involve, in response to making the determination, generating a route for the vehicle in the geographic area based at least on the route avoiding travel of the vehicle through the one or more locations. Yet further, at block 908, method 900 may involve operating the vehicle to travel in accordance with the generated route.

VII. Example Computer Program Product

Figure 10:
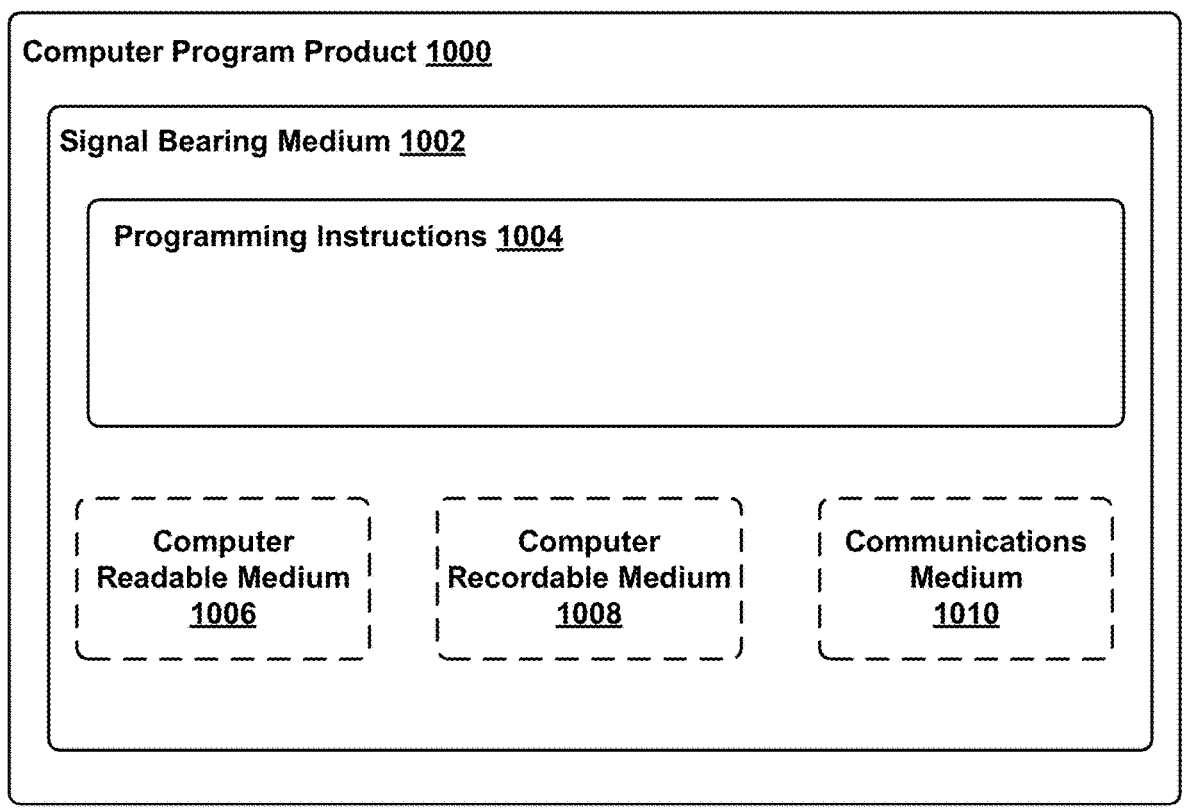
FIG. 10 is a schematic diagram of a computer program product, according to an example implementation.

FIG. 10 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 1000 is provided using signal bearing medium 1002, which may include one or more programming instructions 1004 that, when executed by one or more processors may provide functionality or portions of the functionality described above with respect to FIGS. 1-9. In some examples, the signal bearing medium 1002 may encompass a non-transitory computer-readable medium 1006, such as, but not limited to, a hard disk drive, a CD, a DVD, a digital tape, memory, components to store remotely (e.g., on the cloud) etc. In some implementations, the signal bearing medium 1002 may encompass a computer recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communications link, a wireless communication link, etc.). Similarly, the signal bearing medium 1002 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 1002 may be conveyed by a wireless form of the communications medium 1010.

The one or more programming instructions 1004 may be, for example, computer executable and/or logic implemented instructions. In some examples, a computing device such as the computer system 112 of FIG. 1 or remote computing system 302 and perhaps server computing system 306 of FIG. 3 or one of the processor of FIG. 4A may be configured to provide various operations, functions, or actions in response to the programming instructions 1004 conveyed to the computer system 112 by one or more of the computer readable medium 1106, the computer recordable medium 1008, and/or the communications medium 1010.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

VIII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An autonomous vehicle, comprising:
   a mechanical system;
   an image capture device configured to generate image data indicative of a traffic light;
   a computer system in communication with the mechanical system and the image capture device, wherein the computer system comprises:
     a processor; and
     data storage, wherein the data storage contains instructions executable by the processor to perform functions comprising:
       identifying a position and an orientation of the image capture device in an environment of the autonomous vehicle;
       determining whether the sun will cause degradation in image quality of the image data indicative of the traffic light to a threshold low level, wherein the determining is based on a time of day, the position of the image capture device, and the orientation of the image capture device; and
       responsive to a determination that the sun will cause degradation in image quality of the image data indicative of the traffic light to the threshold low level, generating a route to proactively avoid the sun causing the degradation in image quality of the image data indicative of the traffic light and operating the autonomous vehicle to travel along the route.

2. A method comprising:
   identifying a position and an orientation of an image capture device of an autonomous vehicle in an environment of the autonomous vehicle, wherein the image capture device is configured to generate image data indicative of a traffic light;
   determining whether the sun will cause degradation in image quality of the image data indicative of the traffic light to a threshold low level, wherein the determining is based on a time of day, the position of the image capture device, and the orientation of the image capture device; and
   responsive to a determination that the sun will cause degradation in image quality of the image data indicative of the traffic light to the threshold low level, generating a route to proactively avoid the sun causing the degradation in image quality of the image data indicative of the traffic light and operating the autonomous vehicle to travel along the route.

3. The autonomous vehicle of claim 1, wherein the functions further comprise:
   determining the position and orientation of the image capture device based on the vehicle traveling through one or more locations in a geographic area.

4. The autonomous vehicle of claim 1, wherein operating the autonomous vehicle to travel along the route comprises:
   operating the vehicle to avoid travel of the vehicle through one or more locations in a geographic area.

5. The autonomous vehicle of claim 4, wherein the one or more locations include at least one of a portion of a particular traffic lane, a portion of a particular road, or a portion of a particular intersection.

6. The autonomous vehicle of claim 1, wherein determining whether the sun will cause degradation in image quality of the image data indicative of the traffic light to the threshold low level comprises:
   determining an expected position of the sun with respect to a particular location for one or times of a particular day.

7. The autonomous vehicle of claim 6, wherein determining the expected position of the sun with respect to the particular location comprises:
   determining an altitude angle of the sun and an azimuth angle of the sun.

8. The autonomous vehicle of claim 1, wherein determining whether the sun will cause degradation in image quality of the image data indicative of the traffic light to the threshold low level comprises:
   determining whether the sun will be proximate to the traffic light within a field of view of the image capture device from a perspective of the image capture device.

9. The autonomous vehicle of claim 8, wherein determining whether the sun will be proximate to the traffic light within the field of view of the image capture device from the perspective of the image capture device comprises:
   determining whether one or more objects will result in occlusion of the sun from the perspective of the image capture device.

10. The autonomous vehicle of claim 1, wherein the functions further comprise:
    determining the orientation of the image capture device at the identified position based on elevation data.

11. The method of claim 2, further comprising:
determining the orientation of the image capture device at the identified position based on elevation data.

12. The method of claim 2, wherein determining whether the sun will cause degradation in image quality of the image data indicative of the traffic light to the threshold low level comprises:
determining whether the sun will be proximate to the traffic light within a field of view of the image capture device from a perspective of the image capture device.

13. The method of claim 2, further comprising:
determining the position and orientation of the image capture device based on the vehicle traveling through one or more locations in a geographic area.

14. The method of claim 2, wherein operating the autonomous vehicle to travel along the route comprises:
operating the vehicle to avoid travel of the vehicle through one or more locations in a geographic area.

15. The method of claim 14, wherein the one or more locations include at least one of a portion of a particular traffic lane, a portion of a particular road, or a portion of a particular intersection.

16. The method of claim 2, wherein determining whether the sun will cause degradation in image quality of the image data indicative of the traffic light to the threshold low level comprises:
determining an expected position of the sun with respect to a particular location for one or times of a particular day.

17. The method of claim 16, wherein determining the expected position of the sun with respect to the particular location comprises:
determining an altitude angle of the sun and an azimuth angle of the sun.

18. The method of claim 12, wherein determining whether the sun will be proximate to the traffic light within the field of view of the image capture device from the perspective of the image capture device comprises:
determining whether one or more objects will result in occlusion of the sun from the perspective of the image capture device.

* * * * *